United States Patent
Dewing et al.

(10) Patent No.: US 7,461,067 B2
(45) Date of Patent: Dec. 2, 2008

(54) SYSTEM FOR SUPPORTING PRODUCTION, MANAGEMENT AND DELIVERY OF MEDIA CONTENT FOR WIRELESS DEVICES

(75) Inventors: Shane R. Dewing, Sherman Oaks, CA (US); Braxton Woodham, Los Angeles, CA (US); Wesley W. Biggs, Santa Monica, CA (US); Harry C. Evans, III, Beverly Hills, CA (US); Scott A. Bendar, Santa Monica, CA (US)

(73) Assignee: Motricity, Inc., Bellevue, WA (US)

( * ) Notice: Subject to any disclaimer, the term of this patent is extended or adjusted under 35 U.S.C. 154(b) by 1183 days.

(21) Appl. No.: 10/243,883

(22) Filed: Sep. 13, 2002

(65) Prior Publication Data

US 2004/0068532 A1 Apr. 8, 2004

(51) Int. Cl.
*G06F 7/00* (2006.01)
(52) U.S. Cl. .................................. 707/10; 707/1; 707/2
(58) Field of Classification Search ........... 707/1–104.1
See application file for complete search history.

(56) References Cited

U.S. PATENT DOCUMENTS

| | | | | |
|---|---|---|---|---|
| 5,403,639 A * | 4/1995 | Belsan et al. | | 707/204 |
| 5,625,815 A * | 4/1997 | Maier et al. | | 707/8 |
| 5,659,701 A * | 8/1997 | Amit et al. | | 719/317 |
| 6,088,717 A * | 7/2000 | Reed et al. | | 709/201 |
| 6,389,538 B1 * | 5/2002 | Gruse et al. | | 713/194 |
| 6,542,075 B2 * | 4/2003 | Barker et al. | | 340/506 |
| 6,606,744 B1 * | 8/2003 | Mikurak | | 717/174 |
| 6,948,070 B1 * | 9/2005 | Ginter et al. | | 713/193 |
| 2002/0032688 A1 * | 3/2002 | Serrano-Morales et al. | | 707/104.1 |
| 2002/0062360 A1 * | 5/2002 | Ishiguro | | 709/219 |
| 2002/0120474 A1 * | 8/2002 | Hele et al. | | 705/4 |
| 2002/0133503 A1 * | 9/2002 | Amar et al. | | 707/104.1 |
| 2002/0194227 A1 * | 12/2002 | Day et al. | | 707/523 |
| 2003/0005452 A1 * | 1/2003 | Rodriguez | | 725/86 |
| 2003/0093790 A1 * | 5/2003 | Logan et al. | | 725/38 |
| 2004/0264402 A9 * | 12/2004 | Whitmore et al. | | 370/328 |

* cited by examiner

*Primary Examiner*—Wilson Lee
*Assistant Examiner*—Linh Black
(74) *Attorney, Agent, or Firm*—Waddey & Patterson, P.C.; Phillip E. Walker

(57) ABSTRACT

In a system for providing media content to a communication device, a device capabilities determination is made by a rules engine that compares content attributes with constraints on those attributes for a device. Metadata describing the content is derived and entered into a database. As the specifications of different devices are entered into the system, corresponding constraints are associated with the devices that tell the engine the valid range of values for the content attributes. The engine creates an available content library for each class of devices by excluding all instances of content that have attributes outside the range of values prescribed in the constraints. A similar rule set determines whether the content can be distributed through a particular delivery channel, based on the distribution channel capacity to support a media type. The subset of content that passes both the device capabilities tests and the distribution capability tests is viable for delivery to a device over a particular distribution channel.

63 Claims, 32 Drawing Sheets

FIG. 4

Performance View: Who Let The Dogs Out

Who Let The Dogs Out *(Baha Men)*
Media Type: audio
Performance Type: song
Rating Filter: 0

Full list of artists:

- Baha Men

Attributes:

| Attribute | Value |
|---|---|
| Album | Who Let The Dogs Out |
| Genre | Dance |
| Label | Artemis |
| Year | 2000 |
| Country | Bahamas |

Content "Tree":

- audio/Nokia Proprietary - none - Ported from V3 system (ACTIVE, Moviso Admin, updated: 2002-07-26 16:00:01:28)
  - audio/x-pn-realaudio - who let the dog p.rm - Ported from V3 system as preview (ACTIVE, Moviso Admin, updated: 2002-07-26 16:01:36:176)
  - audio/x-ms-wma - who let the dog p.wma - Ported from V3 system as preview (ACTIVE, Moviso Admin, updated: 2002-07-26 16:01:36:176)
- audio/Nokia Proprietary - none - Ported from V3 system (ACTIVE, Moviso Admin, updated: 2002-07-26 16:00:01:28)
  - audio/x-pn-realaudio - bournemouth dogs.rm - Ported from V3 system as preview (ACTIVE, Moviso Admin, updated: 2002-07-26 16:01:36:176)
  - audio/x-ms-wma - bournemouth dogs.wma - Ported from V3 system as preview (ACTIVE, Moviso Admin, updated: 2002-07-26 16:01:36:176)
- audio/Motorola Proprietary - none - Ported from V3 system (ACTIVE, Moviso Admin, updated: 2002-07-26 16:00:01:28)
  - audio/x-pn-realaudio - who let_dog p.rm - Ported from V3 system as preview (ACTIVE, Moviso Admin, updated: 2002-07-26 16:01:36:176)
  - audio/x-ms-wma - who let_dog_p.wma - Ported from V3 system as preview (ACTIVE, Moviso Admin, updated: 2002-07-26 16:01:36:176)

Ringtone Production for this Performance
Graphic Production for this Performance

Upload New Content

Content View: Who Let The Dogs - audio/Nokia Proprietary - Ported from V3 system

Description: Ported from V3 system
Filename: none
Content Type: audio/Nokia Proprietary
Status: Active
Deliverable: YES
Performance: Who Let The Dogs Out
Owner: Moviso Admin
Created: 2002-07-03 00:06:00.256
Updated: 2002-07-26 16:00:01.28
Content Attribute Values:

| Attribute | Value |
|---|---|
| BYTE_COUNT | 224 |
| DURATION_STYLE_CHANGE_COUNT | 0 |
| ENCODED_TEMPO_NUMBER | 14 |
| HAS_INFINITE_LOOP | 0 |
| HAS_LEGATO | 0 |
| HAS_STACCATO | 0 |
| HIGHEST_NOTE | 73 |
| LOWEST_NOTE | 61 |
| MET_VERSION | 15.1.1 |
| NOTE_PLUS_REST_COUNT | 60 |
| PHRASE_DEFINED_COUNT | 1 |
| PHRASE_USED_COUNT | 1 |

Child Content "Tree":

- audio/x-pn-realaudio - who let dog p.rm - Ported from V3 system as preview (ACTIVE, Moviso Admin, updated: 2002-07-26 16:01:36:176)
- audio/x-ms-wma - who let dog p.wma - Ported from V3 system as preview (ACTIVE, Moviso Admin, updated: 2002-07-26 16:01:36:176)

Preview(s) of this Content:

- audio/x-pn-realaudio - who let dog p.rm - Ported from V3 system as preview (ACTIVE, Moviso Admin, updated: 2002-07-26 16:01:36:176)
- audio/x-ms-wma - who let dog p.wma - Ported from V3 system as preview (ACTIVE, Moviso Admin, updated: 2002-07-26 16:01:36:176)

FIG. 5

Content View: Who Let The Dogs – audio/Motorola Proprietary – Ported from V3 system

Description: Ported from V3 system
Filename: none
Content Type: audio/Motorola Proprietary
Status: Active
Deliverable: YES
Performance: Who Let The Dogs Out
Owner: Moviso Admin
Created: 2002-07-03 01:46:10.733
Updated: 2002-07-26 16:00:01.28
Content Attribute Values:

| Attribute | Value |
|---|---|
| BYTE_COUNT | 119 |
| ENCODED_TEMPO_NUMBER | 3 |
| HIGHEST_NOTE | 77 |
| LOWEST_NOTE | 65 |
| MET_VERSION | 15.1.1 |
| NOTE_PLUS_REST_COUNT | 33 |

Child Content "Tree":

- audio/x-pn-realaudio – who_let_dog_p.rm – Ported from V3 system as preview (ACTIVE, Moviso Admin, updated: 2002-07-26 16:01:36:176)
- audio/x-ms-wma – who_let_dog_p.wma – Ported from V3 system as preview (ACTIVE, Moviso Admin, updated: 2002-07-26 16:01:36:176)

Preview(s) of this Content:

- audio/x-pn-realaudio – who_let_dog_p.rm – Ported from V3 system as preview (ACTIVE, Moviso Admin, updated: 2002-07-26 16:01:36:176)
- audio/x-ms-wma – who_let_dog_p.wma – Ported from V3 system as preview (ACTIVE, Moviso Admin, updated: 2002-07-26 16:01:36:176)

View the Actual Contest
Preview via "send-to-phone"...
Ringtone Production for "Who Let The Dogs Out" (under this content)
Upload Child Content
Add a New Note

FIG. 6

Content To Payload Mapping

Content to Project Mapping

Project Configurator - New Client Page

Create New Client client name: [          ]

notes: [                                    ]

[Okay]                                              [Cancel]

*FIG. 8a*

Project Configurator - Client Management Page

Cingular

Notes:

[Modify] [Delete]

Catalogs

CingularExtras [Edit Catalog] [Edit Storefronts]
**Top Content [Edit Catalog] [Edit Storefronts]
**Promo         [Edit Catalog] [Edit Storefronts]

[Add]

Contacts

[Add]

Edit Access By Login

[Add]

*FIG. 8b*

Project Configurator

Create a Catalog

Catalog Name: [                    ]

Notes: [                    ]

Territory: [United States ▼]
Time Zone: [Eastern Standard Time ▼]
Currency Code: [USD]

Select Networks: ☐ T-Mobile GSM PCS
☐ Cingular GSM PCS

[ Select Products ]  [Cancel]

*FIG. 8c*

Catalog Designer - Catalog Manager

Catalogs

Demo
70's
80's

FIG. 9

Catalog Designer - Category Manager

Demo                 Categories for catalog Demo

Demo    Edit Price Codes    Web Service Codes
        Demo [edit] [create subcategory] [manage content]
           Caller Graphics [edit] [create subcategory] [manage content] [delete]

FIG. 10

Catalog Designer - Category Manager

Demo                 Categories for catalog Demo

Demo    Edit Price Codes    Web Service Codes
        Demo [edit] [create subcategory] [manage content]
           Tunes [edit] [create subcategory] [manage content] [delete]
           Caller Graphics [edit] [create subcategory] [manage content] [delete]

FIG. 12

Demo
<u>Demo</u>

Catalog Designer - Create A New Category

Creating New Subcategory in: Demo

| | |
|---|---|
| Category name | [Tunes] |
| Product Types | ☑ Ringtone |
| | ☐ Screensaver |
| | ☐ Caller Icon |
| Default price code | [STANDARD ▶] |
| Rating filter | [G ▶] |
| Seasonal? | ☐ (if checked, choose from list below) |
| Start Date | [February ▶] [1] |
| End Date | [February ▶] [1] |
| Auto Add | ☐ (if enabled, choose from list below) |
| Auto Add From | [YourMobile::Ringtones::80's ▶] |

[Okay] [Cancel]

*FIG. 11*

Catalog Designer - Create A New Category

Demo
Demo

Editing Category: Demo

| | |
|---|---|
| Category name | [Tunes] |
| Product Types | ☑ Ringtone |
| | ☐ Screensaver |
| | ☐ Caller Icon |
| Default price code | [STANDARD ▶] |
| Rating filter | [G ▶] |
| Seasonal? | ☐ (if checked, choose from list below) |
| Start Date | [February ▶] [1] |
| End Date | [February ▶] [1] |
| Auto Add | ☐ (if enabled, choose from list below) |
| Auto Add From | [YourMobile ▶] |

[Okay] [Cancel]

*FIG. 13*

Catalog Designer - Create A New Category

Demo
Demo

Catalog: Demo  Category: Tunes

Titles

| Remove | Title/Artist | Price Code | Ringtone Motorola Ringtone (M1a) unlimited | Ringtone Nokia Ringtone (N1a) unlimited | Ringtone Nokia Ringtone (N1b) unlimited | Ringtone Nokia Ringtone (N1c) unlimited |
|---|---|---|---|---|---|---|
| ☐ | A Little Respect / Erasure | STANDARD ▼ | ☑ | ☐ | ☑ | ☑ |
| ☐ | All The Way / Frank Sinatra | STANDARD ▼ | ☐ | ☑ | ☑ | ☑ |
| ☐ | Two Tribes / Frankie Goes To Hollywood | STANDARD ▼ | ☐ | ☑ | ☑ | ☑ |
| ☐ | Liebestraum / Franz Liszt | STANDARD ▼ | ☐ | ☑ | ☑ | ☑ |

[Add Titles] [Apply] [Done] [Cancel]

FIG. 14

Catalog Request Example

```
<CatalogRequest xmlns:xsi="http://www.w3.org/2001/XMLSchema-instance"
xsi:noNamespaceSchemaLocation="http://webservices.moviso.com/XML/schema/CatalogRequ
est.xsd" schemaVersion="1.0">
    <Client id="24"/>
    <Storefront id="5"/>
    <Model id="1"/>
    <Model id="2"/>
</CatalogRequest>
```

Catalog Request Schema

```
<?xml version="1.0" encoding="UTF-8"?>
<!--
CatalogRequest schema - defines rules for validation of Catalog Requests.

$Author: ata $
$Revision: 1.4 $

-->
<xsd:schema xmlns:xsd="http://www.w3.org/2001/XMLSchema"
elementFormDefault="qualified" version="1.4">
    <xsd:element name="CatalogRequest">
        <xsd:complexType>
            <xsd:sequence>
                <xsd:element name="Client" type="ClientType"/>
                <xsd:element name="Storefront" type="StorefrontType"/>
                <xsd:element name="Model" type="ModelType" maxOccurs="unbounded"/>
            </xsd:sequence>
            <xsd:attribute name="schemaVersion" type="xsd:decimal" use="required"/>
        </xsd:complexType>
    </xsd:element>
    <xsd:complexType name="ClientType">
        <xsd:attribute name="id" type="xsd:int" use="required"/>
    </xsd:complexType>
    <xsd:complexType name="StorefrontType">
        <xsd:attribute name="id" type="xsd:int" use="required"/>
    </xsd:complexType>
    <xsd:complexType name="ModelType">
        <xsd:attribute name="id" type="xsd:int" use="required"/>
    </xsd:complexType>
</xsd:schema>
```

*FIG. 16*

Catalog Response Example

```xml
<?xml version="1.0" encoding="UTF-8"?>
<CatalogResponse xmlns:xsi="http://www.w3.org/2001/XMLSchema-instance"
xmlns:noNamespaceSchemaLocation="
http://webservices.moviso.com/XML/schema/CatalogResponse.xsd" currencyCode="USD">
    <Model id="1" name="3390" make="Nokia">
        <Product id="1" name="Ringtone" platform="Nokia Ringtone (SMF)" />
        <Product id="2" name="Screen Saver" platform="Nokia ScreenSaver (SMF)" />
        <Product id="4" name="Operator Logo" platform="Nokia Operator Logo (SMF)"
/>
        <Product id="3" name="Picture Message" platform="Nokia Picture Message
(SMF)" />
        <Product id="30" name="Ringtone" platform="TestPlat1" />
        <Product id="31" name="Operator Logo" platform="TestPlat1" />
        <Product id="32" name="Ringtone" platform="TestPlat1" />
    </Model>
    <Model id="2" name="8290" make="Nokia">
        <Product id="1" name="Ringtone" platform="Nokia Ringtone (SMF)" />
        <Product id="4" name="Operator Logo" platform="Nokia Operator Logo (SMF)"
/>
        <Product id="3" name="Picture Message" platform="Nokia Picture Message
(SMF)" />
        <Product id="5" name="Caller Icon" platform="Nokia Caller Icon (SMF)" />
    </Model>
    <Category id="80" name="Main Catalog">
        <Description>Root Category</Description>
        <Category id="81" name="Ringtones">
```

*FIG. 17a*

```xml
            <Category id="82" name="Top Hits">
                <Title name="The Carpet Crawlers" type="song" price="0.99">
                    <Artists displayName="Genesis">
                        <Artist searchName="GENESIS">OLD_Genesis</Artist>
                    </Artists>
                    <ContentDeliveryCode id="240">
                        <Product id="1" />
                        <Preview mediaType="audio/wav"
uri="http://preview.moviso.com/PreviewContent?previewId=18&contentDeliveryCodeI
d=240" />
                    </ContentDeliveryCode>
                </Title>
                <Title name="Suspended In Gaffa" type="song" price="0.99">
                    <Artists displayName="Kate Bush">
                        <Artist searchName="KATE BUSH">OLD_Kate Bush</Artist>
                    </Artists>
                    <ContentDeliveryCode id="242">
                        <Product id="1" />
                    </ContentDeliveryCode>
                </Title>
                <Title name="Shock the Monkey" type="song" price="0.99">
                    <Artists displayName="Peter Gabriel">
                        <Artist searchName="PETER GABRIEL">OLD_Peter
Gabriel</Artist>
                    </Artists>
                    <ContentDeliveryCode id="247">
                        <Product id="1" />
                    </ContentDeliveryCode>
                </Title>
                <Title name="Gigantic" type="song" price="0.99">
                    <Artists displayName="Pixies">
                        <Artist searchName="PIXIES">OLD_Pixies</Artist>
                    </Artists>
                    <ContentDeliveryCode id="244">
                        <Product id="1" />
                    </ContentDeliveryCode>
                </Title>
                <Title name="A Day in the Life" type="song" price="0.99">
                    <TitleAttribute type="Album" value="Meet the Beatles" />
                    <TitleAttribute type="Genre" value="Classic Rock" />
                    <TitleAttribute type="Label" value="Sony Records" />
                    <TitleAttribute type="Year" value="1964" />
                    <Artists displayName="Beatles">
                        <Artist searchName="BEATLES">OLD_Beatles</Artist>
                    </Artists>
                    <ContentDeliveryCode id="267">
                        <Product id="1" />
                    </ContentDeliveryCode>
                </Title>
            </Category>
        </Category>
        <Title name="A Day in the Life" type="song" price="0.99">
            <TitleAttribute type="Album" value="Meet the Beatles" />
            <TitleAttribute type="Genre" value="Classic Rock" />
            <TitleAttribute type="Label" value="Sony Records" />
            <TitleAttribute type="Year" value="1964" />
            <Artists displayName="Beatles">
                <Artist searchName="BEATLES">OLD_Beatles</Artist>
            </Artists>
            <ContentDeliveryCode id="268">
                <Product id="1" />
            </ContentDeliveryCode>
        </Title>
    </Category>
</CatalogResponse>
```

FIG. 17b

Catalog Response Schema

```xml
<?xml version="1.0" encoding="UTF-8"?>
<!--
CatalogResponse schema - defines rules for validation of Catalog Response.

$Author: ata $
$Revision: 1.10 $

-->
<xsd:schema xmlns:xsd="http://www.w3.org/2001/XMLSchema"
elementFormDefault="qualified" version="1.10">
    <xsd:element name="CatalogResponse">
        <xsd:complexType>
            <xsd:sequence>
                <xsd:element name="Model" type="ModelType" maxOccurs="unbounded"/>
                <xsd:element name="Category" type="CategoryType"/>
            </xsd:sequence>
            <xsd:attribute name="currencyCode" type="xsd:string" use="required"/>
        </xsd:complexType>
    </xsd:element>
    <xsd:complexType name="CategoryType">
        <xsd:sequence>
            <xsd:element ref="Description" minOccurs="0"/>
            <xsd:element name="Category" type="CategoryType" minOccurs="0"
maxOccurs="unbounded"/>
            <xsd:element name="Title" type="TitleType" minOccurs="0"
maxOccurs="unbounded"/>
        </xsd:sequence>
        <xsd:attribute name="name" type="xsd:string" use="required"/>
        <xsd:attribute name="id" type="xsd:int" use="required"/>
    </xsd:complexType>
    <xsd:complexType name="ContentDeliveryCodeType">
        <xsd:sequence>
            <xsd:element name="Product" type="ProductType"/>
            <xsd:element name="Preview" type="PreviewType" minOccurs="0"
maxOccurs="unbounded"/>
        </xsd:sequence>
        <xsd:attribute name="id" type="xsd:int" use="required"/>
    </xsd:complexType>
    <xsd:element name="Description" type="xsd:string"/>
    <xsd:complexType name="ModelType">
        <xsd:sequence>
            <xsd:element name="Product" type="ProductType" maxOccurs="unbounded"/>
        </xsd:sequence>
        <xsd:attribute name="id" type="xsd:int" use="required"/>
        <xsd:attribute name="name" type="xsd:string" use="required"/>
        <xsd:attribute name="make" type="xsd:string" use="required"/>
    </xsd:complexType>
    <xsd:complexType name="PreviewType">
        <xsd:attribute name="mediaType" type="xsd:string" use="required"/>
        <xsd:attribute name="uri" type="xsd:anyURI" use="required"/>
    </xsd:complexType>
    <xsd:complexType name="ProductType">
        <xsd:attribute name="id" type="xsd:int" use="required"/>
        <xsd:attribute name="name" type="xsd:string"/>
        <xsd:attribute name="platform" type="xsd:string"/>
    </xsd:complexType>
    <xsd:complexType name="TitleType">
        <xsd:sequence>
            <xsd:element name="TitleAttribute" type="TitleAttributeType" minOccurs="0"
maxOccurs="unbounded"/>
            <xsd:element name="Artists" type="ArtistsType"/>
            <xsd:element name="ContentDeliveryCode" type="ContentDeliveryCodeType"/>
        </xsd:sequence>
```

FIG. 17c

```
    <xsd:attribute name="name" type="xsd:string" use="required"/>
        <xsd:attribute name="type" type="xsd:string" use="required"/>
        <xsd:attribute name="price" type="xsd:decimal" use="required"/>
     </xsd:complexType>
     <xsd:complexType name="TitleAttributeType">
        <xsd:attribute name="type" type="xsd:string" use="required"/>
        <xsd:attribute name="value" type="xsd:string" use="required"/>
     </xsd:complexType>
     <xsd:complexType name="ArtistsType">
       <xsd:sequence>
         <xsd:element name="Artist" type="ArtistType" minOccurs="0"
maxOccurs="unbounded"/>
       </xsd:sequence>
       <xsd:attribute name="displayName" type="xsd:string" use="required"/>
     </xsd:complexType>
     <xsd:complexType name="ArtistType">
       <xsd:simpleContent>
         <xsd:extension base="xsd:string">
           <xsd:attribute name="searchName" type="xsd:string" use="required"/>
         </xsd:extension>
       </xsd:simpleContent>
     </xsd:complexType>
</xsd:schema>
```

FIG. 17d

Billing

Content Delivery Request Example

```
<?xml version="1.0" encoding="UTF-8"?>
<ContentDeliveryRequest xmlns:xsi="http://www.w3.org/2001/XMLSchema-instance"
xsi:noNamespaceSchemaLocation="
http://webservices.moviso.com/XML/schema/ContentDeliveryRequest.xsd"
schemaVersion="1.0">
    <DeliveryAddress>13108047902</DeliveryAddress>
    <ContentDeliveryCode id="247">
        <PictureMessageText>alabala</PictureMessageText>
    </ContentDeliveryCode>
    <Price>1.00</Price>
    <Operator id="5"/>
    <Storefront id="5"/>
    <SalesChannel id="1"/>
    <ClientTransaction id="UFO978239HI"/>
    <BillingAddress>13108047902</BillingAddress>
    <Model id="27"></Model>
    </ContentDeliveryRequest>
```

Content Delivery Request Schema

```
<?xml version="1.0" encoding="UTF-8"?>
<!--
ContentDeliveryRequest schema - defines rules for validation of Content Delivery
Requests.

$Author: ata $
$Revision: 1.7 $

-->
<xsd:schema xmlns:xsd="http://www.w3.org/2001/XMLSchema"
elementFormDefault="qualified" version="1.6">
    <xsd:element name="ContentDeliveryRequest">
        <xsd:complexType>
            <xsd:sequence>
                <xsd:element ref="DeliveryAddress"/>
                <xsd:element name="ContentDeliveryCode"
type="ContentDeliveryCodeType"/>
```

FIG. 19a

```
              <xsd:element ref="Price"/>
              <xsd:element name="Operator" type="OperatorType"/>
              <xsd:element name="Storefront" type="StorefrontType"/>
              <xsd:element name="SalesChannel" type="SalesChannelType"/>
              <xsd:element name="ClientTransaction" type="ClientTransactionType"
minOccurs="0"/>
              <xsd:element ref="BillingAddress" minOccurs="0"/>
              <xsd:element name="Model" type="ModelType" minOccurs="0"/>
          </xsd:sequence>
          <xsd:attribute name="schemaVersion" type="xsd:decimal" use="required"/>
      </xsd:complexType>
  </xsd:element>
  <xsd:element name="DeliveryAddress" type="xsd:long"/>
  <xsd:complexType name="ContentDeliveryCodeType">
    <xsd:sequence>
      <xsd:element ref="PictureMessageText" minOccurs="0"/>
    </xsd:sequence>
    <xsd:attribute name="id" type="xsd:int" use="required"/>
  </xsd:complexType>
  <xsd:element name="PictureMessageText" type="xsd:string"/>
  <xsd:element name="Price" type="xsd:decimal"/>
  <xsd:complexType name="OperatorType">
    <xsd:attribute name="id" type="xsd:int" use="required"/>
  </xsd:complexType>
  <xsd:complexType name="StorefrontType">
    <xsd:attribute name="id" type="xsd:int" use="required"/>
  </xsd:complexType>
  <xsd:complexType name="SalesChannelType">
    <xsd:attribute name="id" type="xsd:int" use="required"/>
  </xsd:complexType>
  <xsd:complexType name="ClientTransactionType">
    <xsd:attribute name="id" type="xsd:string" use="required"/>
  </xsd:complexType>
  <xsd:element name="BillingAddress" type="xsd:long"/>
  <xsd:complexType name="ModelType">
    <xsd:attribute name="id" type="xsd:int" use="required"/>
  </xsd:complexType>

</xsd:schema>
```

FIG. 19b

Content Delivery Response Example

```
<?xml version="1.0" encoding="UTF-8"?>
<ContentDeliveryResponse xmlns:xsi="http://www.w3.org/2001/XMLSchema-instance"
xmlns:noNamespaceSchemaLocation="http://webservices.moviso.com/XML/schema/ContentDe
liveryResponse.xsd">
    <MovisoTransaction id="367" />
    <ClientTransaction id="UFO978239HI" />
</ContentDeliveryResponse>
```

Content Delivery Response Schema

```
<?xml version="1.0" encoding="UTF-8"?>
<!--
ContentDeliveryResponse schema - defines rules for validation of ContentDelivery
responses.

$Author: ata $
$Revision: 1.3 $

-->
<xsd:schema xmlns:xsd="http://www.w3.org/2001/XMLSchema"
elementFormDefault="qualified" version="1.3">
    <xsd:element name="ContentDeliveryResponse">
        <xsd:complexType>
            <xsd:sequence>
                <xsd:element name="MovisoTransaction" type="MovisoTransactionType"/>
                <xsd:element name="ClientTransaction" type="ClientTransactionType"/>
            </xsd:sequence>
        </xsd:complexType>
    </xsd:element>
    <xsd:complexType name="MovisoTransactionType">
        <xsd:attribute name="id" type="xsd:short" use="required"/>
    </xsd:complexType>
    <xsd:complexType name="ClientTransactionType">
        <xsd:attribute name="id" type="xsd:string" use="required"/>
    </xsd:complexType>
</xsd:schema>
```

*FIG. 20*

Account Status Request Example

```
<?xml version="1.0" encoding="UTF-8"?>
<AccountStatusRequest xmlns:xsi="http://www.w3.org/2001/XMLSchema-instance"
xsi:noNamespaceSchemaLocation="http://webservices.moviso.com/XML/schema/AccountStat
usRequest.xsd" schemaVersion="1.0">
    <BillingAddress>1234567890</BillingAddress>
    <SalesChannel id="6"/>
    <Storefront id="4"/>
</AccountStatusRequest>
```

Account Status Request Schema

```
<?xml version="1.0" encoding="UTF-8"?>
<!--
AccountStatusRequest schema - defines rules for validation of AccountStatus
Requests.

$Author: ata $
$Revision: 1.4 $

-->
<xsd:schema xmlns:xsd="http://www.w3.org/2001/XMLSchema"
elementFormDefault="qualified" version="1.3">
  <xsd:element name="AccountStatusRequest">
    <xsd:complexType>
      <xsd:sequence>
        <xsd:element ref="BillingAddress"/>
        <xsd:element name="SalesChannel" type="SalesChannelType"/>
        <xsd:element name="Storefront" type="StorefrontType"/>
      </xsd:sequence>
      <xsd:attribute name="schemaVersion" type="xsd:decimal" use="required"/>
    </xsd:complexType>
  </xsd:element>
  <xsd:element name="BillingAddress" type="xsd:long"/>
  <xsd:complexType name="SalesChannelType">
    <xsd:attribute name="id" type="xsd:int" use="required"/>
  </xsd:complexType>
  <xsd:complexType name="StorefrontType">
    <xsd:attribute name="id" type="xsd:int" use="required"/>
  </xsd:complexType>
</xsd:schema>
```

*FIG. 23*

Account Status Response Example

```
<?xml version="1.0" encoding="UTF-8"?>
<AccountStatusResponse xmlns:xsi="http://www.w3.org/2001/XMLSchema-instance"
xmlns:noNamespaceSchemaLocation="http://webservices.moviso.com/XML/schema/AccountSt
atusResponse.xsd">
    <Balance>3</Balance>
</AccountStatusResponse>
```

Account Status Response Schema

```
<?xml version="1.0" encoding="UTF-8"?>
<!--
AccountStatusRequest schema - defines rules for validation of Account Status
Requests.
$Author: ata $
$Revision: 1.2 $
-->
<xsd:schema xmlns:xsd="http://www.w3.org/2001/XMLSchema"
elementFormDefault="qualified" version="1.2">
  <xsd:element name="AccountStatusResponse">
    <xsd:complexType>
      <xsd:sequence>
        <xsd:element ref="Balance"/>
      </xsd:sequence>
    </xsd:complexType>
  </xsd:element>
  <xsd:element name="Balance" type="xsd:decimal"/>
</xsd:schema>
```

*FIG. 24*

SYSTEM FOR SUPPORTING PRODUCTION, MANAGEMENT AND DELIVERY OF MEDIA CONTENT FOR WIRELESS DEVICES

BACKGROUND OF THE INVENTION

1. Field of the Invention

The invention relates generally to systems and methods for providing media content for mobile communication devices and, more particularly, to systems and methods for supporting the production, management and delivery of media content for wireless devices.

2. Description of the Related Art

A typical system for distributing media content, such as audio-based ringtones, to mobile communication devices over a communication network includes a library of media content stored in a file server and a means for sending the media content to a device. Each piece of media content is stored in a format compatible with one or more communication devices. For example, an audio file stored in a Nokia proprietary format is considered to be compatible with all models of Nokia telephones. Among the various models of Nokia telephones, however, there may be different types of media capabilities. For example, one telephone model may be capable of playing an audio file such as "ringtones" of a certain byte duration and note range while another model has different duration and range capabilities.

Existing media content distribution systems do not account for these differences in device capabilities. Thus, a piece of media content associated with Nokia telephones may be sent to any Nokia telephone regardless of the capabilities of the particular telephone model. If the particular model receiving the content does not have the proper capabilities, the content may not be able to be played or, if it can be played, will be limited by the model capabilities. For example, the duration of the ringtone may be truncated or the note range modified to accommodate the capability of the particular telephone. Thus, the user of the device is not able to hear the "true" ringtone.

In view of the foregoing limitations of existing media distribution systems, those skilled in the art have recognized a need for a system that is capable of providing media content to a variety of communication devices operating over various communications networks and with various media content capabilities such that the possibility of providing incompatible media content to an end-user device is substantially eliminated. The invention fulfills these needs and others.

SUMMARY OF THE INVENTION

Briefly, and in general terms, the invention is directed to various systems and methods for providing media content for mobile communication devices. The systems and methods take the media content capabilities of the device into consideration when determining which media content is available for a given device. The distribution channel over which a device operates may also be taken into consideration.

In a first aspect, the invention relates to a system for making one or more pieces of media content available for delivery to an end-user device. The system includes a file server with a plurality of media content files stored therein and a database. The database associates content type attributes with each of the media content files and attribute capability constraints with the end-user device. The attribute capability constraints prescribe a range of acceptable values for content type attributes. The system also includes a first rules engine that creates an available library of media content that excludes all media content that have content type attributes outside the range of acceptable values.

In another aspect of the system, the database associates a carrier network with the end-user device. The carrier network, in turn, has an associated delivery channel capacity. The system further includes a second rules engine adapted to refine the available library to exclude all media content not supported by the delivery channel of the end-user device.

A key differentiator between the prior system and the system of the present invention is the capacity for the system to determine whether media content of a particular type is viable for delivery to a given device or class of devices. Existing systems operate on the premise that all content marked as active in a database is viable for the devices it is associated with. In accordance with the system of the present invention, content availability is determined from a combination of rules for device capabilities and rules for distribution capabilities.

The device capabilities determination is made by a rules-based engine that compares content attributes (typically metadata derived by content examination programs) with constraints on those attributes for a device. There are effectively two main steps to this process: firstly, metadata describing the content is derived and entered into the database; secondly, as the specifications of different devices are entered into the system, corresponding constraints are associated with the devices that tell the rules engine what the valid range of values for each content attribute is. As output of this process, the rules engine creates an available content library for each class of devices by excluding all instances of media content that have attributes outside the range of values prescribed in the constraints.

A similar rule set determines whether the content can be distributed through a particular delivery channel, based on factors such as territory-based licensing of content, distribution channel capacity to support the given media type, and business agreements with third-party distributors and networks that would allow or disallow content of that type to be distributed. The subset of content that passes both the device capabilities tests described above and the distribution capability tests can be determined to be viable for delivery to a given end-user device over a particular distribution channel. Thus, the system substantially eliminates the possibility of providing incompatible media content to an end-user device and instead provides only the most viable media content in view of the operating parameters, i.e., content constraints, delivery channel capacity, etc., associated with a given device.

These and other aspects and advantages of the invention will become apparent from the following detailed description and the accompanying drawings which illustrate by way of example the features of the invention.

BRIEF DESCRIPTION OF THE DRAWINGS

FIG. 4 is an exemplary listing of the information associated with a performance of FIG. 3, including media type, performance type, performance attributes and content tree;

FIGS. 5 and 6 are exemplary listings of the information associated with two of the contents listed in the content tree of FIG. 4, including content type, content attribute values and child content tree;

FIGS. 8a-8c are exemplary user interfaces associated with the project configurator aspect of the media management function of FIG. 2;

FIGS. 9-15 are exemplary user interfaces associated with the catalog designer aspect of the media management function of FIG. 2;

FIG. 16 provides an exemplary code listing for a catalog request;

FIGS. 17a-17d provide an exemplary code listing for a catalog response;

FIGS. 19a and 19b provide an exemplary code listing for a content delivery request;

FIG. 20 provides an exemplary code listing for a content delivery response;

FIG. 23 provides an exemplary code listing for an account status request; and

FIG. 24 provides an exemplary code listing for an account status response.

DETAILED DESCRIPTION OF THE PREFERRED EMBODIMENTS

Figure 1:
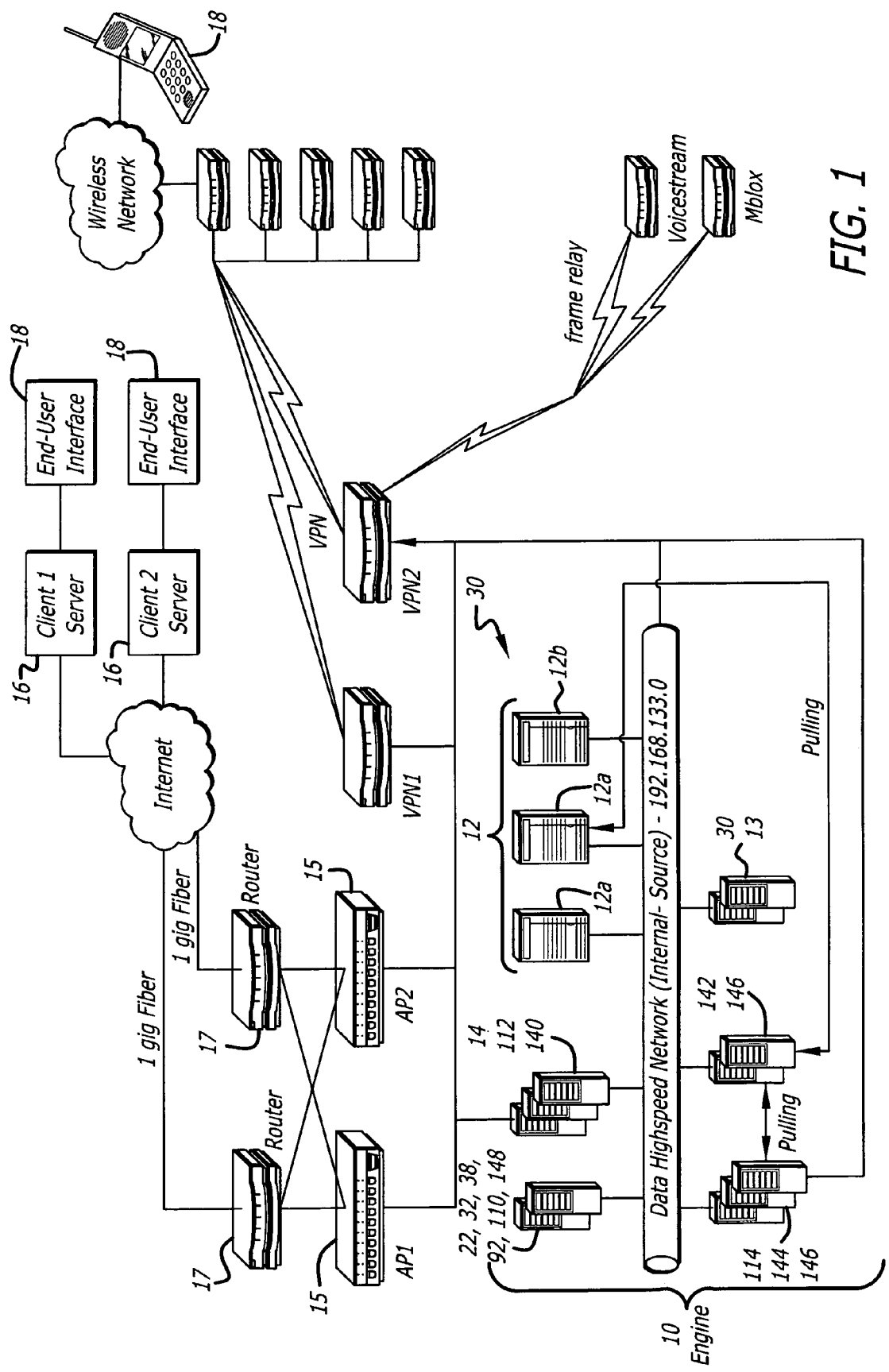
FIG. 1 is a block diagram of an exemplary communications system configured in accordance with the invention and including an engine with a database, file servers and client-server interface interfacing with a number of client servers.

Referring now to the drawings, particularly to FIG. 1, there is shown a block diagram of a communications system configured to deliver media content to an end-user device over a wireless carrier network. "Media content", as used herein includes, but is not limited to, ringtones, graphics, photographs, text messages and other audio, video, audiovisual, textual or interactive content as well as actual software applications such as games, alert applications and media players. An "end-user device" includes, but is not limited to, cellular telephone handsets, such as those manufactured by Nokia, Motorola, Sony Ericsson, Samsung and Kyocera. End-user devices may also include personal digital assistants (PDA), pagers, wireless e-mail devices, wireless calenders, GPS enabled devices and wireless game devices.

The system includes an engine 10 with various database related components and server related components working in conjunction to provide a library of media content. Database related components include a database system 12 which stores metadata of the media content while the server system includes a file server system 13 which stores the actual media content. The metadata in the database system 12 includes a uniform resource locator (URL) to the media content in the file server system 13. In a preferred configuration of the system, the database system 12 includes at least two production databases 12a to provide a level of redundancy and an additional replication server database 12b to manage and synchronize the redundant databases. In one configuration, the redundant databases are Sun 420 RS boxes running on the Sun Solaris operating system and the replication server database is a Sun 220 box running Sybase database software. The filer servers 13 are Intel 2U, 1 GHz dual processor CPUs running the Linux operating system.

The system also includes a client-server interface 14 for providing communication between the engine 10 and one or more client servers 16. The client-server interface 14 is housed within a triple redundant CPU system comprised of Intel 2U, 1 GHz dual processor CPUs, and interfaces with the client servers 16 through a network of switches 15 and routers 17. The client servers 16 themselves, interface with one or more end-users through an end-user interface 18. The end-user interface 18 may be a browser running on a personal computer or the end-user device itself, e.g., cellular telephone or a client application.

The system or platform is built as a layered multitier server application. The Sybase relational database management system is used for data storage but application code components are implemented in the Java programming language using Java 2 as the platform. A Java Database Connectivity (JDBC) driver provided by the database vendor is used to connect the datastore to the application.

The lowest-level component of the Java core of the application is a toolkit called XORM (an acronym for eXtensible Object-Relational Mapping). XORM is an open source implementation of the Java Data Objects (JDO) specification which allows application developers to work with the relational data in the database as if it were native Java data objects. XORM facilitates the automatic generation of Structure Query Language (SQL) statements and queries in order to perform operations on persistent data.

The central part of the application consists of logic classes that provide shared business logic to the externally facing parts of the system. The logic classes include components to manage the complex relationships between different types of data and are broken down into core divisions based on their responsibilities. One contains functions that enable the available library of content, one provides methods to navigate the complexities of the content to device mapping application (C2DMA), and so on.

The external face of the application is created using the Java Servlet and Java Server Pages application programming interfaces defined by Sun Microsystems. The open source Jakarta Tomcat servlet engine created by the Apache Group is used to host these components. In addition, many of the web-based interfaces in the system rely on the Jakarta Struts template engine, which adds a Model-View-Controller paradigm to the servlet and JSP model. Other components that provide XML (eXtensible Markup Language) output are built similarly but use the open source JDOM API for generating and managing data using the XML document object model.

The external connectivity pieces of the application, including the content distributors and delivery mechanisms, use the core services provided by the business logic classes and database connectivity layers. They also rely on additional proprietary software and components provided by third-party vendors to provide Java code access to complex communication protocols.

Figure 2:
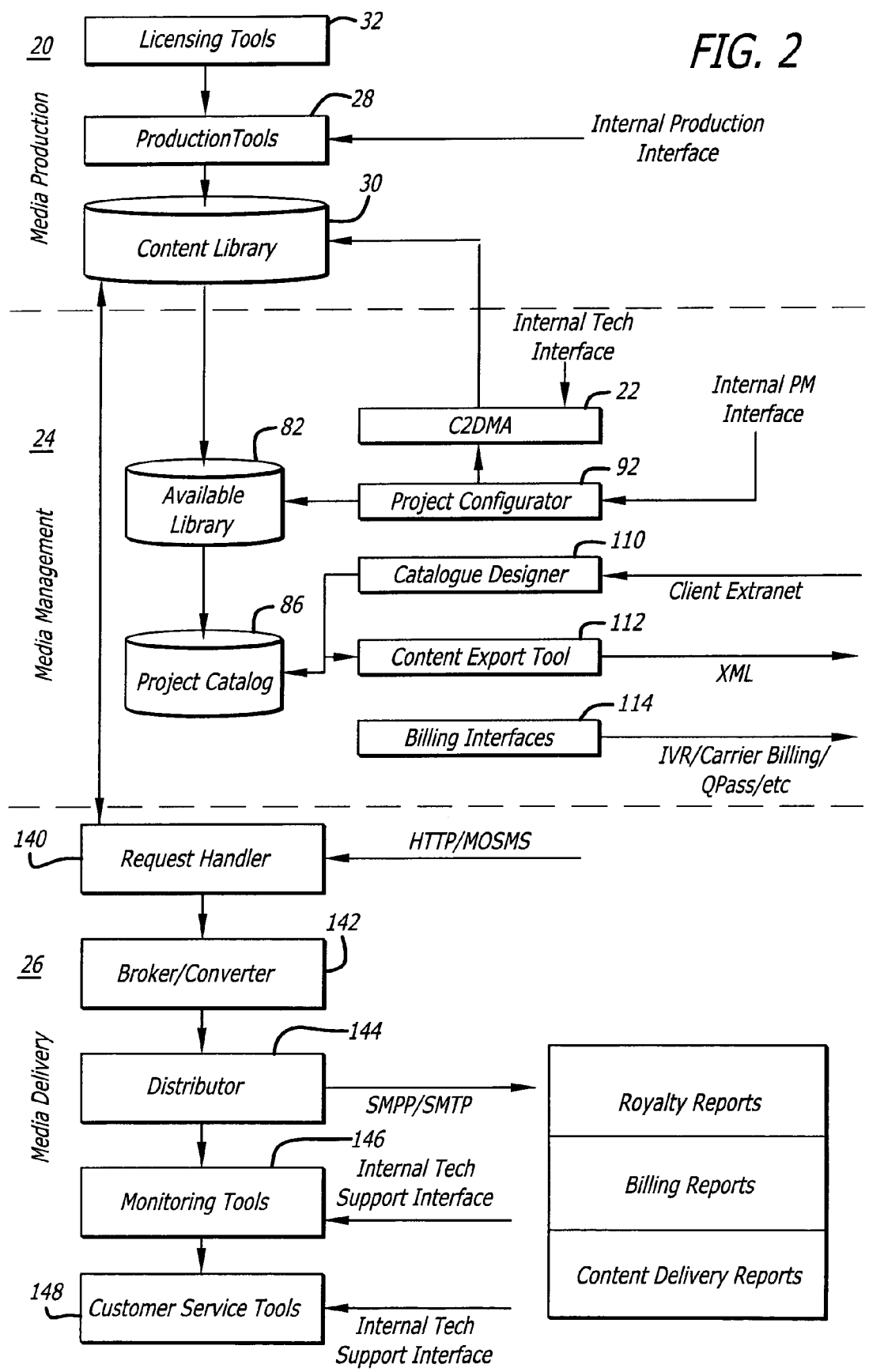
FIG. 2 is a block diagram of the functions performed by the system of FIG. 1 including media production, media management and media delivery.

With reference to FIG. 2, the system includes various functionally interrelated operating modules and database components, including a media production aspect 20, a content-to-device-mapping application (C2DMA) module 22, a media management aspect 24 and a media delivery aspect 26. The media production portion 20 is responsible for the creation and storage of media content. The media management portion 24 is responsible for the management of content catalogs and associated projects and clients through the client-server interface 14 (FIG. 1). The media delivery aspect 26 of the system is responsible for the delivery of content through any available channel to any addressable end-user device. The C2DMA 22 handles the management and selection of appropriate media content for users based on a variety of factors described in detail below. A detailed description of each portion of the system follows. The operating modules described below are contained within the various redundant processing unit systems shown in FIG. 1. Each of these processing units is an Intel 2U, 1 GHz dual processor CPU. Common numeric identifiers in FIGS. 1 and 2 show the relationship between the functional modes (FIG. 2) and the system hardware (FIG. 1).

Media Production

Figure 3:
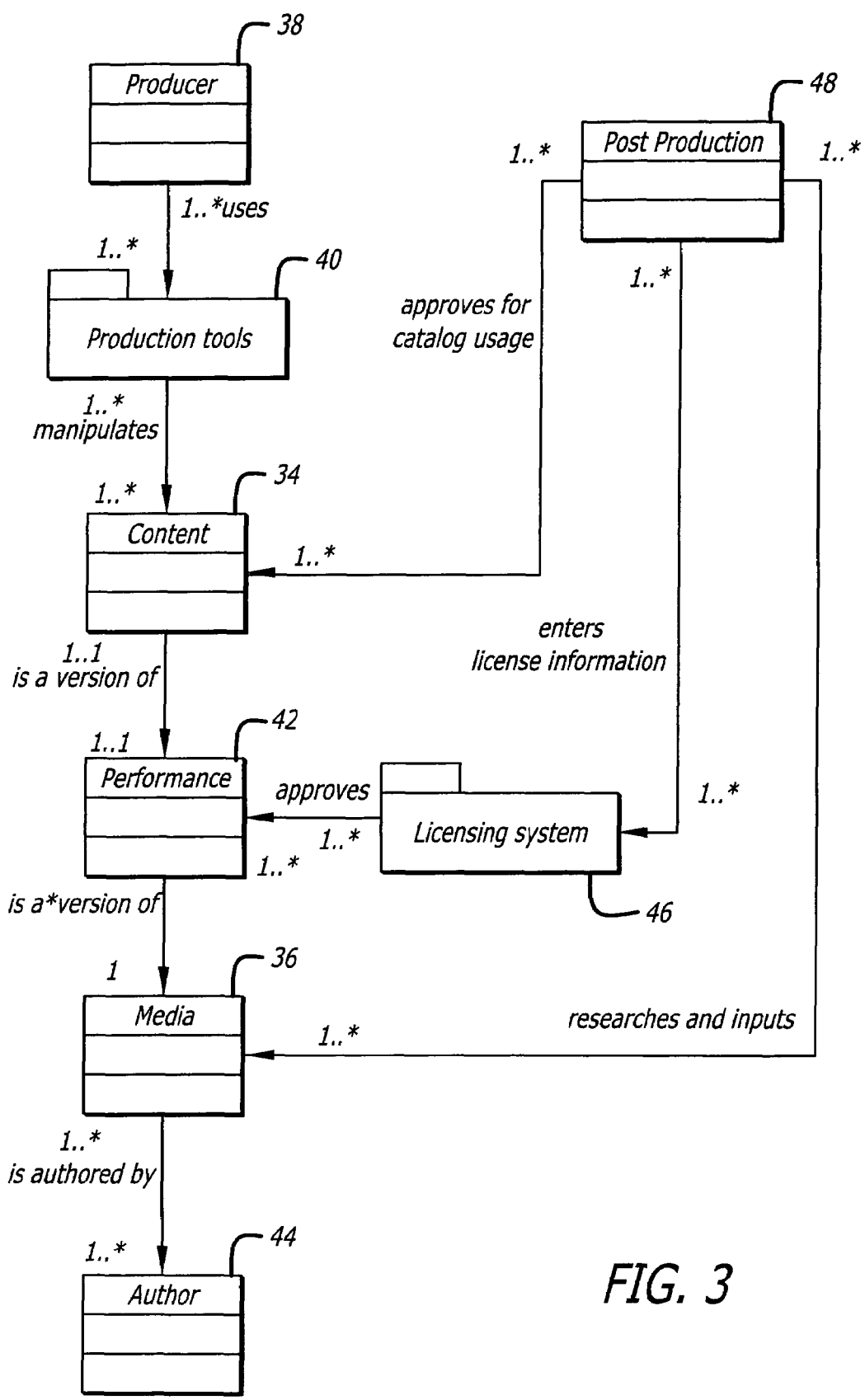
FIG. 3 is a conceptual model related to the media production function of FIG. 2.

With the continued reference to FIG. 2, the media production aspect 20 of the system includes a production tools module 28 and a master media content library 30, referred to herein as the "master library". The media production aspect may also include a licensing tools module 32. With reference to the conceptual model of FIG. 3, the media production aspect 20 allows for the creation of a piece of content 34 from an original piece of media 36. The content 34 is made by a producer 38 using production tools 40. Production tools 40 include algorithms which are specific for end-user devices. In the case of ringtones, these algorithms manipulate a source file, e.g., MIDI file, of the media 36 into a piece of content 34 that is compatible with a particular end-user device. The algorithms used by the producer 38 are based on the operation attributes of the end-user device and are often provided by the manufacturer of the end-user device. For example, some end-user devices cannot reproduce a musical note above high "C". The algorithm associated with this end-user device takes this into account when manipulating the source file. A description and example of the major blocks of the media production portion 20 of the system follows.

Media 36 is an original work, such as the written music of a song or a piece of art created by an author 44. A piece of media 36 may have several performances 42. An example of a piece of media 36 is "Dock of the Bay" written by Steve Cropper and Otis Redding. A performance 42 is a unique rendering of a piece of media 36. Performances 42 have their own set of attributes such as album name, track length, etc. Thus, for the media "Dock of the Bay", performances might be "Dock of the Bay" by Otis Redding and "Dock of the Bay" by Glen Campbell. Content 34 is a generic container of all forms of digital media. For example, a ringtone's original MIDI, its Real Audio preview, its Motorola ringtone string, its WAV preview—are all unique pieces of content 34 that relate to a performance 42. Thus, for the performance, "Dock of the Bay" by Otis Redding, a piece of content might be "the Motorola ringtone for the Otis Redding performance of Dock of the Bay."

Licensing system 46 refers to the process by which a performance 42 is associated with specific licensing requirements. For example, a performance 42 may be limited to use in a specific geographical region. Post production 48 is performed by someone who has authority to approve content 34 from the standpoint of quality, licensing, etc. A producer 38 is someone who manipulates content 34 into various formats using the production tools 40. A producer may also create the original performance using standard media production tools.

With reference to FIG. 4, various pieces of information are associated with a particular performance, including media type (audio), performance type (song) and rating filter. Each performance is a record in a performance database file stored in the database 12a (FIG. 1). The pieces of information are fields in the performance record. The rating filter assigns a G, PG, PG-13, R, NC-17 or X content rating to the performance. As described further below, this rating filter may be used to limit access to the performance. Each performance has an associated set of attributes, which may include album, genre, label, year and country information. These attributes are fields in the performance record. The attributes may identify one or more geographical territories (not shown) for licensing purposes. As explained further below, the licensing attribute acts as a filter to limit access to a performance based on licensing criteria such as geographical territories and approved clients. Regarding approved clients, certain clients may have the exclusive rights to certain performances based on distributor agreements. Associated with each performance is one or more pieces of content, as listed under the content tree. The pieces of content are associated with the performance record. Content records contain paths to individual media files stored on the content servers 13 (FIG. 1).

With reference to FIGS. 5 and 6, various pieces of information are associated with each piece of content, including content type (audio/Nokia Proprietary, audio/Motorola Proprietary) status (active), deliverable (yes), performance (Who Let the Dogs Out) and several content attributes. These pieces of information are fields in the content record. The content attributes relate to the content media file itself and include, for example, the byte count of the content file and the highest and lowest notes within a media file and dimensions and bit depth in the case of graphics. A content file also may include attributes related to territorial licensing. Each content file's associated attributes and information are stored in a content database file in the database 12a (FIG. 1). The actual data is stored on a file server referenced from the database. Additional details on the content field entries are described under the following C2DMA section.

Content-to-Device-Mapping Application (C2DMA)

Figures 1, 7A:
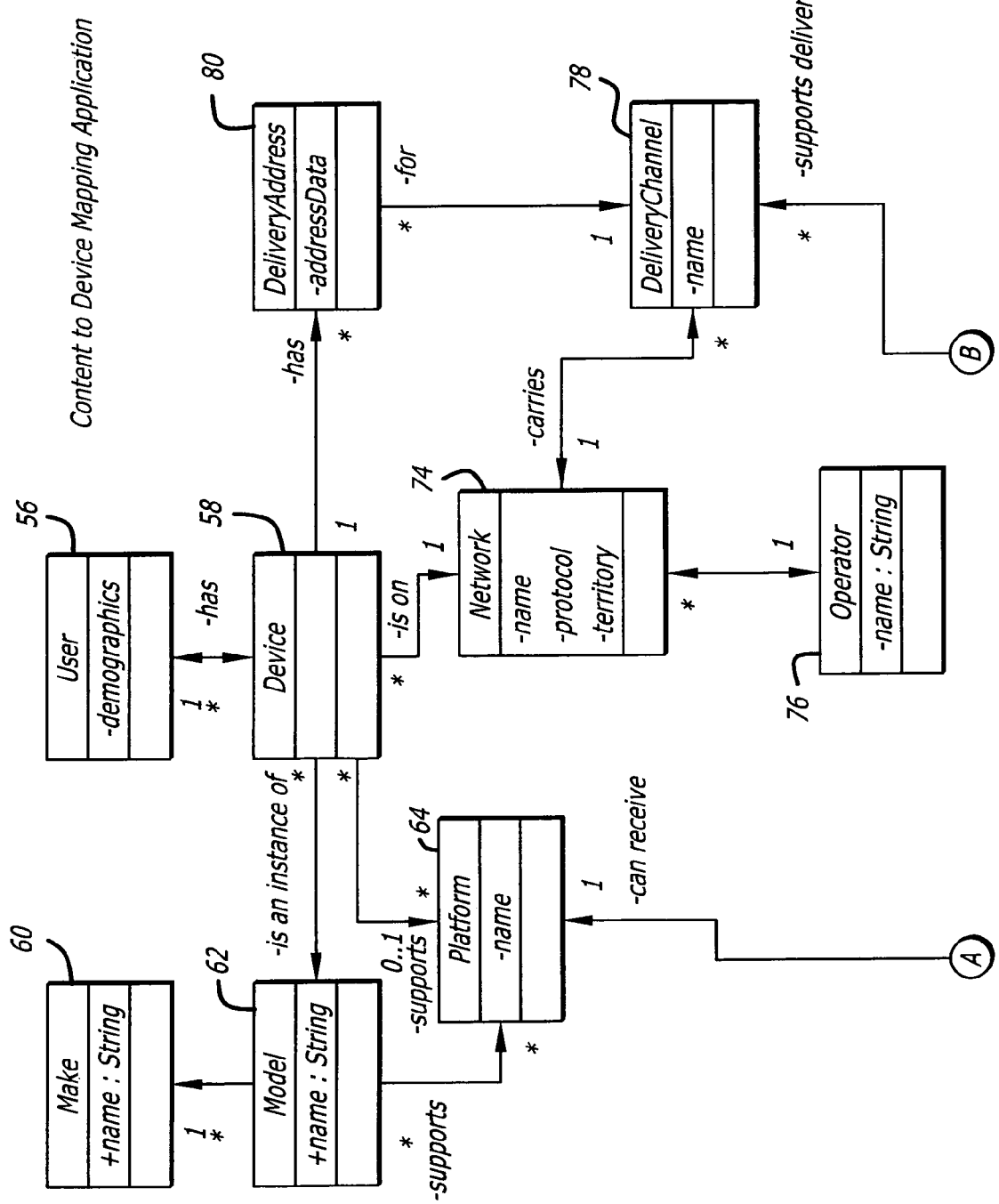
FIG. 7a is a conceptual model related to the content to device mapping (C2DMA) function depicted in FIG. 2.
Figures 2, 7A:
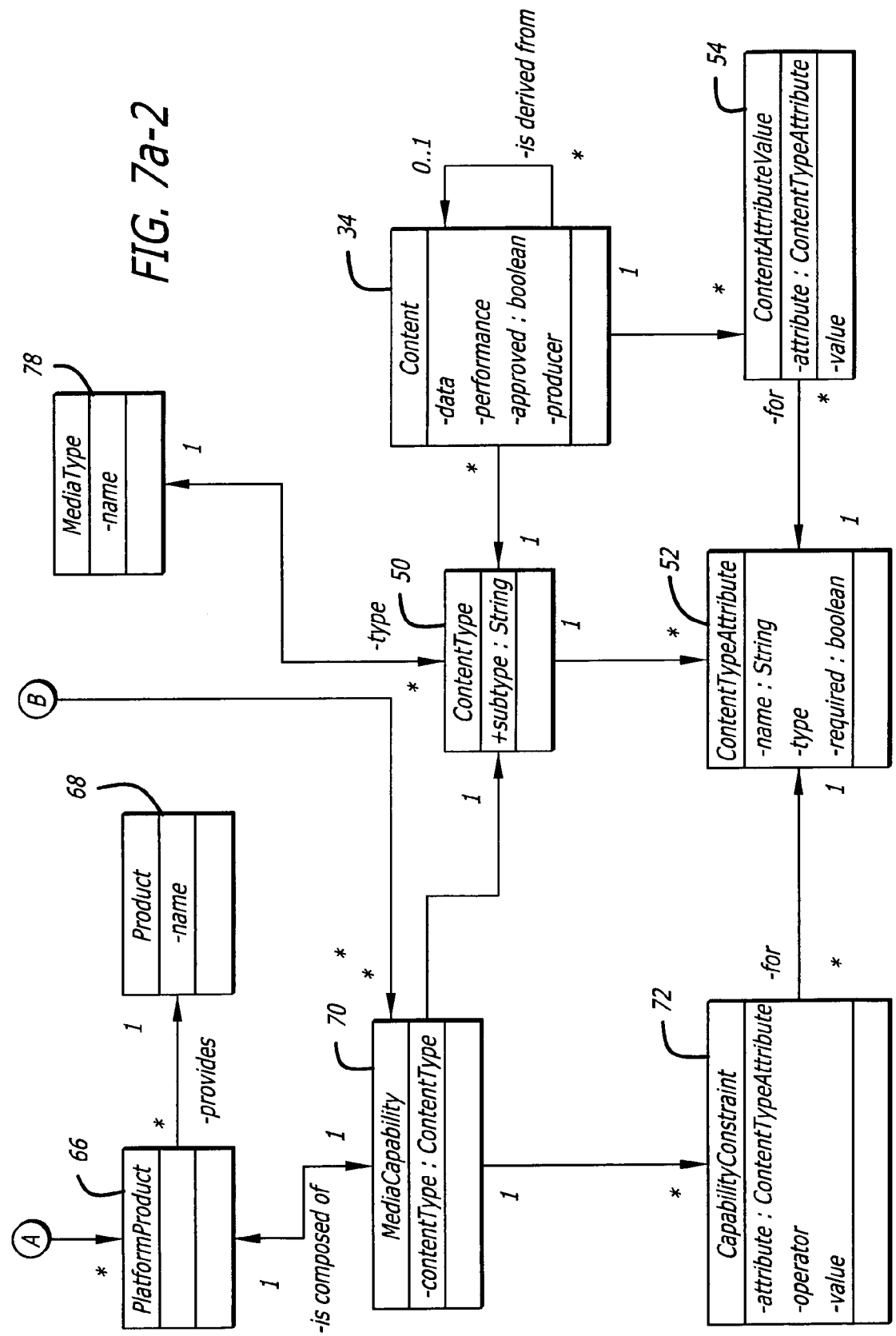

With reference to FIG. 2, as previously mentioned, the C2DMA 22 handles the management and selection of appropriate content for users. In general, the system is capable of managing, serving and delivering correctly formatted content to heterogeneous devices over heterogenous networks. To this end, the system supports multiple makes and models of end-user devices. The system also differentiates between differing makes and models of end-user devices; supports differing functional capabilities of end-user devices that may share the same make and model; recognizes and handles carrier networks that may not allow or support the same functionality, even on the same device; defines the set of products available to a given end-user device and the media constraints for a piece of content to qualify as a product for a device; and associates specific users with specific devices which they own and use. With reference to the conceptual model of FIG. 7a, the C2DMA maps content to end-users using the following subtasks:

Content Description:

The C2DMA provides a metadata model allowing each unique piece of content 34 in the system to be described in such a way that it can be reused. A content type 50 represents a formal declaration of a specific type of content 34 along with a generic description of its possible attributes. Each of the attributes is defined by an instance of the content type attribute 52 class. A content type attribute 52 has a name, a datatype, and a field denoting whether the attribute must be assigned to all content of that type. Note that content type attributes 52 are not meant to provide metadata for the original media title (such as artist, album, etc.), but instead describe details of the electronic media produced. For example, an MP3 file can be stereo or mono, has a bit rate in Kbps or has a variable bit rate with a maximum. In this case a content type "audio/mp3" would be created, with content type attributes named "stereo" (type boolean), "bitRateKbps" (type integer), and "variableBitRate" (type boolean). All three would most likely be marked as required database entries.

As a piece of content 34 is produced and entered into the system, content attribute value 54 items are created to describe the values for content type attributes 52 of its content type 50. All content type attributes 52 marked as required must be specified; others are optional. For example, the "Working in a Coal Mine" MIDI is of type "audio/midi". As content attribute values, it specifies that "numNotes=25", "highNote=G4", "lowNote=E3", etc.

User Device Customization:

The C2DMA architecture supports the possibility of unique capabilities for each individual end-user device. A user 56 owns one or more devices 58. The user 56 may know the make 60 and model 62 of each device 58. In the object model, make 60 and model 62 are simply entities with a name, where a single make can be associated with many models. For example, end-user Barbara owns a Kyocera 3035. "Barbara" is the name of a user; her device object references a model with the name "3035" which in turn references the "Kyocera" make.

A device 58 is the entity that binds a user 56 to a model 62. In some cases, model 62 may not be known, so the device 58 to model 62 mapping is optional. Both models 62 and devices 58 can support any number of platforms 64. A platform 64 is a semantic grouping of distinct platform product 66 definitions, as described below. Multiple models 62 that support the same functionality may be part of the same platform 64. For example, the Nokia 5125 model and the Nokia 5165 model both reference the "Nokia 51 xx" platform.

Platform Product Support:

The C2DMA describes platforms 64 that support specific media products 68. A product 68 is a formal definition of deliverable content that implies both media type and intended use. Two examples of products 68 are "Screen Saver" and "Operator Logo". While these products 68 use the exact same piece of content 34 defined by the exact same size constraints, i.e., content attribute values 54, they represent different uses of the media.

A platform product 66 describes the media type and constraints that specify products 68 deliverable to the platform 64. This is done via a set of media capability 70 objects. The ability for a phone to support ringtones is captured, in the object model, by a platform product 66 that references the product 68 named "Ringtone". Other platform products 66 for the same phone platform may reference "Operator Logo", "Screen Saver", etc.

A media capability 70 references a content type 50 and capability constraints 72 for that content type. A capability constraint 72 specifies the required value or range of acceptable values for a particular content type attribute 52. For example, the Nokia 3390 can utilize operator logos that are monochrome bitmaps exactly 72 pixels wide by 72 pixels high. Here, the "3390" model is linked to a platform 64. This platform 64 references a platform product 66 entry. The platform product 66 references the product 68 named "Operator Logo" and specifies that it is composed of a single media capability 70 for content type 50, "image/ING". Attached to the media capability 70 object are three capability constraints 72, specifying "width=72", "height=72", and "color Depth=1".

Device to Network Mapping:

The C2DMA provides a means of associating specific end-user devices with the carrier networks that service them. A device 58 is on a network 74, which is provided by an operator 76. For example, Steve's Motorola phone (the device) is serviced by Verizon (the operator) on the "Verizon US TDMA" network.

A network 74 can deliver content 34 via a set of delivery channels 78. Delivery channels 78 define a protocol and means of addressing a device 58. Examples of delivery channels 78 include the following:

HTTP: user or agent acquires content by requesting a URL
SMS: requires a phone number
EMS: requires a phone number
Carrier Proprietary: requires a phone number (there might be many of these for different custom protocols)
Email: requires an email address
Manual Entry/user Install: denotes that the content must be acquired by the user via a different channel, for example downloading a PRC application from a PC and later synching with a PDA.
WAP push/pull: user or agent acquires content by requesting a URL
BREW: user must have appropriate client software The relationship between a specific device 58 and a delivery channel 78 is the device's delivery address 80. The format of a delivery address 80 may vary based on the delivery channel 78. For example, the delivery address for the "SMS" delivery channel on Steve's phone contains an address data field with the value "13105551234".

Network Product Support:

The C2DMA describes the ability for specific media products to be delivered via particular network connections and protocols, both public (the Internet) and proprietary SMSCs). Each delivery channel 78 can provide delivery of a set of products 68. For example, the Nokia 51xx line supports delivery of ringtones via SMS.

Associated with each delivery channel 78 for a network 74 is one or more acceptable encodings, provided by subtypes of the converter class. For example, for a specific SMS delivery channel, the ringtones must be sent as hexadecimal sequences with colons between each pair of characters and segmented into data packets or "frames" for SMPP delivery. Some examples of encodings are: binary, hexadecimal encoded, hexadecimal encoded escaped, ZIPped and Base64/UUEncoded.

Figure 7B:
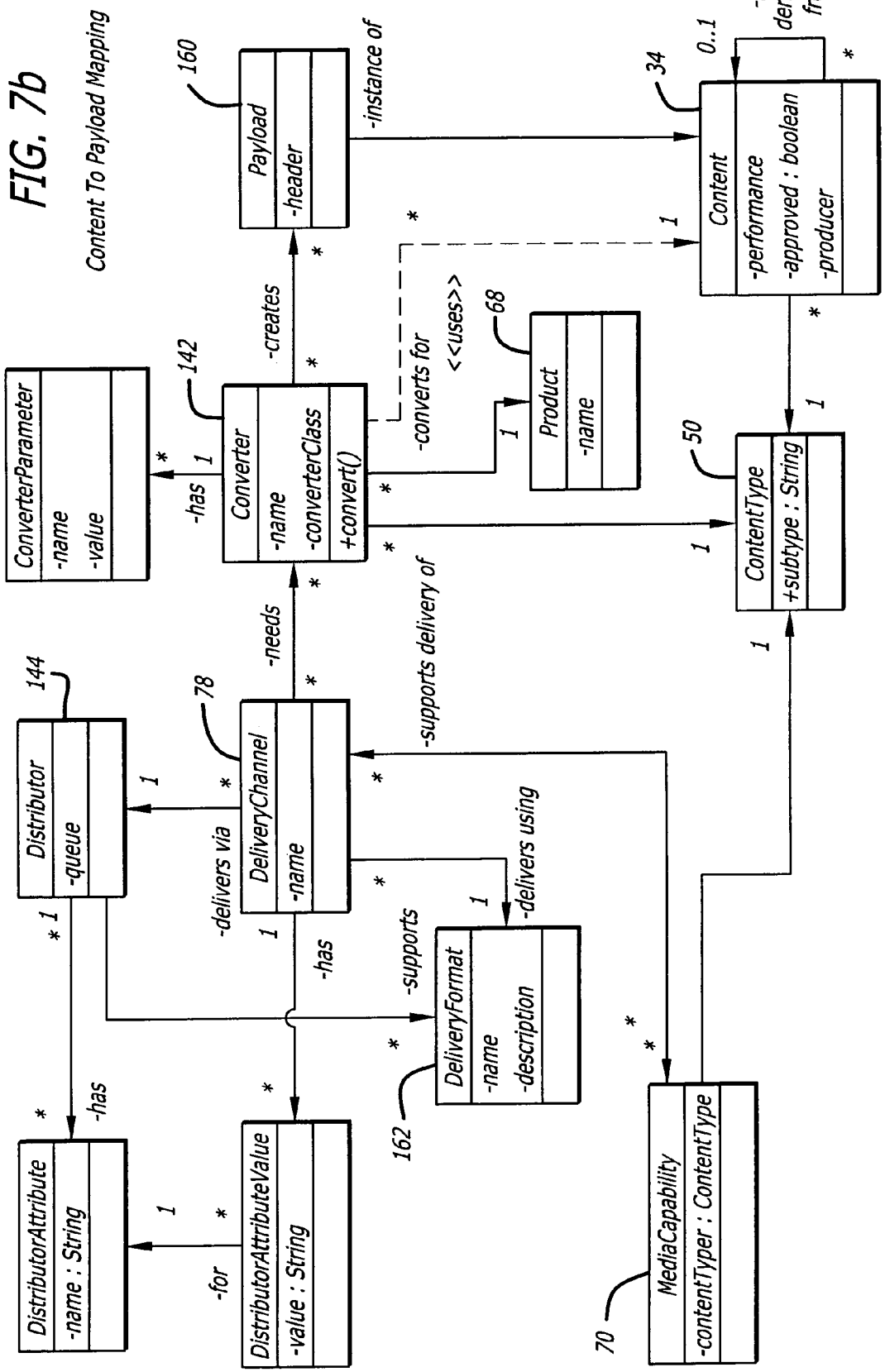
FIG. 7b is a conceptual model related to the content to payload mapping performed by the media delivery function in FIG. 2.

With reference to FIG. 7b, each specific converter 142 encapsulates business logic for translating raw content 34 data to the format specified by the encoding, taking into account the details of the end-user device 58 (FIG. 7a) and network 74. The transformed content is an instance of the payload 160 class. A payload 160 is the customized version of media content 34 for a particular end-user device on a particular delivery network.

Media Management

With reference to FIG. 2, the media management aspect 24 of the system includes an available media content library 82 which is a subset of the master library 30. The available media content library is not a physical entity, i.e., its content resides in the master library. As described further below, attributes, such as content type and territory designation, assigned to a piece of content within the master library 30 determine whether the content may be mapped to a particular available media content library 82.

Figures 1, 7C:
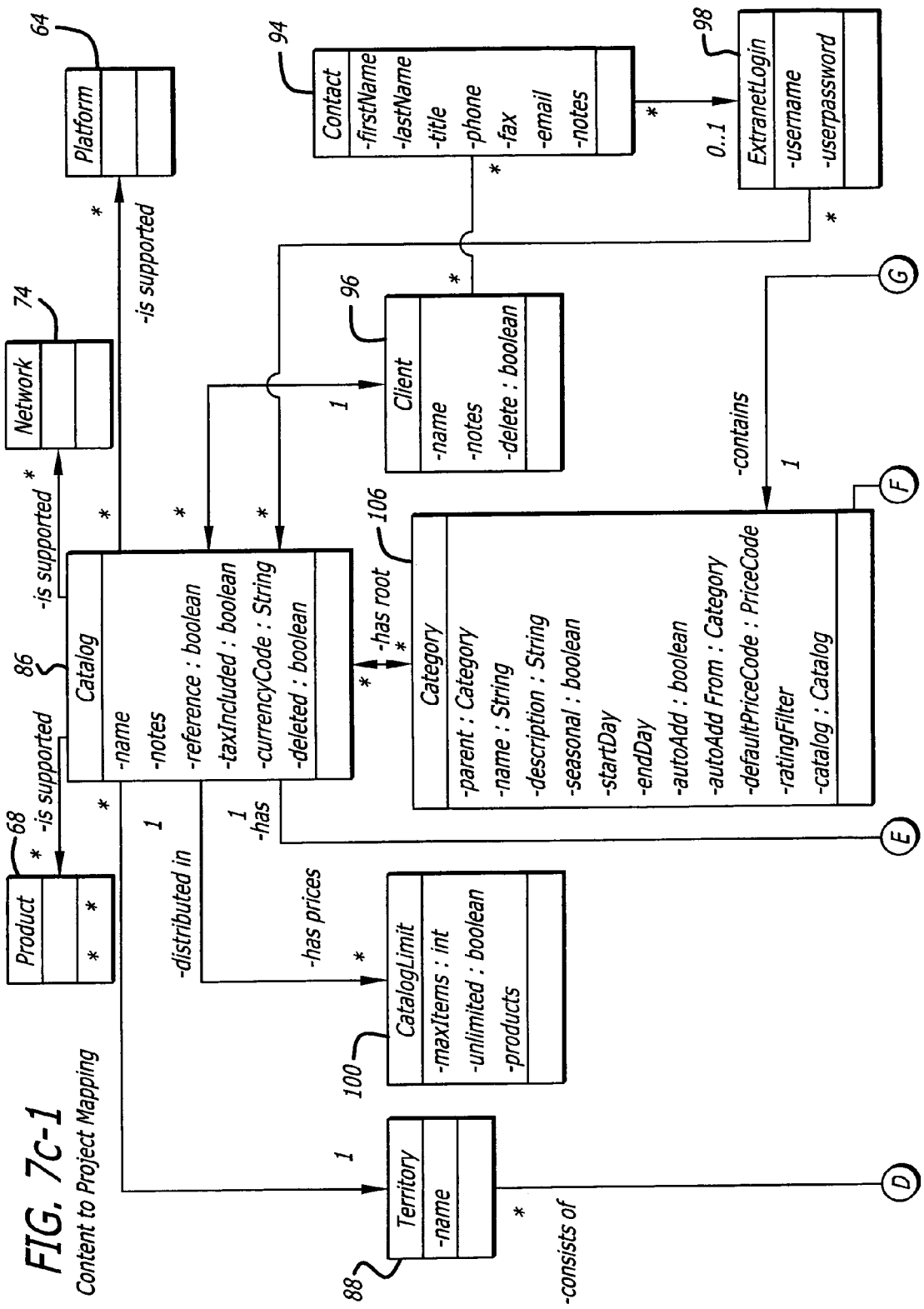
FIG. 7c is a conceptual model related to the project configurator aspect of the media management function of FIG. 2.
Figures 2, 7C:
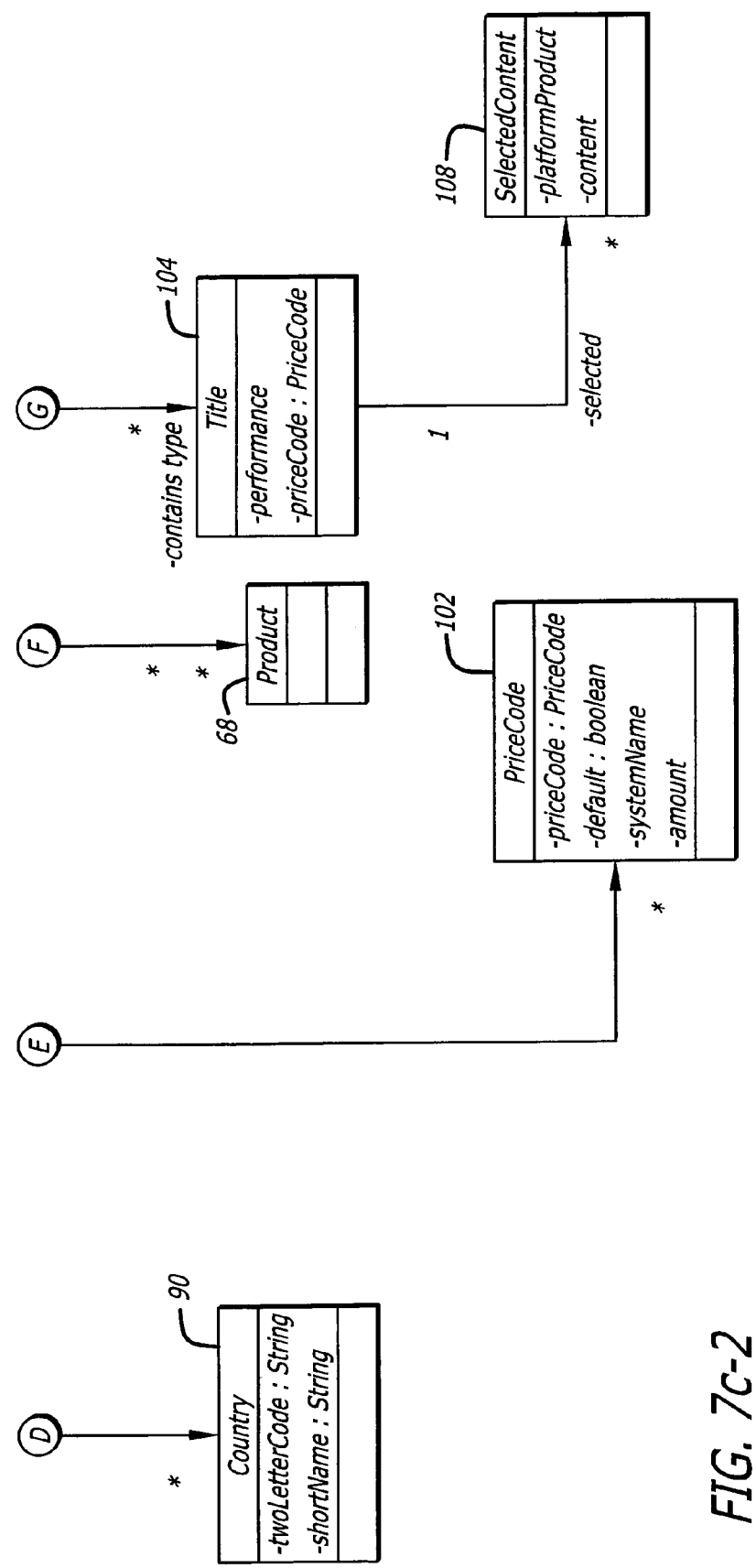

The media management portion 24 of the system provides the tools to create catalogs 86 of media content using the content stored in the master library 30. These catalogs 86 are defined by various parameters, described below, which are stored in system processors (FIG. 1). The media content itself, remains in the file servers 13. Attributes associated with a piece of content and a catalog are used to map content to a catalog. A conceptual model of this mapping relationship is shown in FIG. 7c. As previously mentioned, an available media content library 82 is derived from the master library. This derivation process involves one or more rules engines which act as filters to exclude certain media content in the master library 30 from being associated with the available media content library 82.

In one configuration, a rules engine uses the territory 88 and country 90 associated with a particular catalog 86 to limit the available content for the catalog to those pieces of content having licensing related attributes that match or exceed those of the catalog. For example, if a catalog has North America as a territorial designation, only those pieces of content with a North America territorial designation or greater designation, e.g., worldwide, are mapped to the available media content library 82 of the catalog 86. Other licensing-related parameters, such as approved clients, may be used to limit the available content.

The available media content library 82 may also be refined by another rules engine based on the media capabilities, i.e., platform 64, make (not shown), model (not shown), associated with the catalog 86 and the media capabilities associated with the content of the existing available media content library 82. Thus, the limiting factors in an available media content library 82 are the end-user devices that are supported by the catalog. For example, if a catalog 86 has an associated media capability of "audio/Nokia Proprietary", only those pieces of content within the existing available media content library 82 of the catalog having an associated media capability of "audio/Nokia Proprietary" are mapped to the available media content library 82 of the catalog.

With reference to FIG. 2, the media management portion 24 of the system also includes a project configurator 92 which provides an integrated interface between a project manager (PM) and the master library 30 through the C2DMA 22. The project configurator 92 allows for the creation of client accounts and catalog permissions using standard technologies including Java Server Pages (JSP) and Struts. Data related to the client accounts is stored in system processors (FIG. 1). Various interfaces of the project configurator 92 and the functions provided thereby are described below, with reference to FIG. 7c.

Create New Client:

With reference to FIG. 8a, the PM enters client 96 information which adds a new record to the system database. Client information contains the name of the client and contact 94 information. The first screen of the graphical user interface (GUI) allows the PM to go to "client operations." This screen has a list of current clients. When a new client is created, a form appears for obtaining client information. After filling out the information and selecting "OK," the previous screen appears and the new client now appears on the client list.

Delete (or Disable) Existing Client:

At the "client operations" screen, a client is selected on the list and the delete button is selected. After an "are you sure?" popup ensures that this is not a mistake, the client is marked as "deleted," i.e., is no longer on the list of clients. Client information, however, is not permanently deleted from the system database; it is merely hidden.

Change Client Information:

Basic client information is modified. For example: addresses, contacts, etc. The user navigates to the "client operations" screen, selects a specific client, and selects the modify button. A screen just like the form for creating a new client appears, but information is already filled in. The PM can change this information and hit "OK." The fields are then updated in the system database.

Manage Contacts for the Client:

Contact information is added, including names, phone numbers, etc. At the "client operations" screen, there is a list of contacts 94, and "add", "modify", and "remove" buttons. The add and modify buttons navigate to a screen with client contact information. This information can be added or modified. By selecting "OK," a new database record is created or the existing one is modified.

Create Extranet Logins:

An extranet login 98 allows a client 96 to have limited access to the system. At the "client operations" screen, there is a list of contacts 94. The PM must choose from this list and select the "Create Extranet Login" button. This brings up a screen that asks for the username and password. The system knows who the contact 94 is and what client 96 he is associated with. When this information is entered, a new record is created which is used to validate client logins and initialize the session.

Manage Catalogs:

With reference to FIG. 8b, a client 96 may want changes made to its catalog 86. Such changes may involve the name and catalog limit 100, or even deleting a catalog 86. The system provides an interface for a PM to manage these changes. When a PM chooses to manage catalogs 86 for a client 96, he is presented with a list of catalogs currently defined for the client. Each catalog 86 in the list has an edit and delete link next to it.

Selecting delete causes the system to disable (not physically remove) the catalog 86 by marking it as inactive. The PM is returned to the manage catalogs interface with the selected catalog 86 no longer showing. Selecting edit takes the PM to the change catalog setup details. On the same interface, a button is provided to create new catalogs. When selected, the system presents a create new catalogs screen.

Create New Catalogs:

With reference to FIG. 8c, the system provides an interface allowing a PM to create new catalogs 86 for a client 96. The catalog 86 provides the basis for the client's product 68 offerings to end users. The interface has a text field for entering a name of the catalog 86 and a drop down box with all currently defined territories 88 in it.

The interface provides a list of available networks 74. At least one network must be assigned to the catalog 86, optionally multiple networks can be assigned. The system responds with an interface providing a list of platforms 64 supported by the assigned networks 74, to be assigned to the catalog 86. At least one platform 64 must be assigned, optionally multiple platforms can be selected. The system responds with a list of products 68 to be assigned to the catalog 86. The list of products available for assignment are those capable of being deployed to the previously assigned platforms 64.

When the PM assigns a product 68 to a catalog 86, a catalog limit 100 can be specified. If set, the limit sets the maximum amount of the product 68 the client 96 can add to his catalog 86 from the available library for each supported platform 64. If a limit is not set, no limit is enforced.

The system creates the catalog 86 with the chosen territory 88, networks 74, platforms 64, and products 68 associated with it. In addition, a root category is created in the catalog 86 to store default values for the catalog. A default price code 102 for "free" is created. All categories 106 entered by the client 96, as explained below, are created under this default root category. After creating the catalog 86 and default root category, the PM is returned back to the client management page (FIG. 8*b*).

If more than one network 74 is going to be supported in one catalog 86, the client 96 appends the target network when querying for the XML list of available titles 104, allowing the system to respond with just the titles 104 available for the selected network 74. This is because if the catalog 86 supports multiple networks 74, it may have selected content 108 that can be deployed to one network 74 but not to others. A catalog 86 may have price codes 102 in one or more currencies. Different price codes can be associated with different catalog categories.

Change Catalog Setup Details:

The client 96 may want to change the name of the catalog 86, adjust the catalog limits 100 or even change the networks 74, platforms 64, and products 68 associated with a catalog. This interface shows the name of the catalog 86 in a text box for editing. Below the name a table shows columns containing the supported networks 74, platforms 64, and products 68. At the bottom of each column a link is provided to change the information above the link.

If the PM chooses to change the networks 74, he is taken to interfaces to select the networks, and must reselect the platforms 64 and products 68 since the available platforms and products may have changed when the networks changed. Similarly, if the platforms 64 are changed, the products 68 must be reselected.

The interfaces for selecting the networks 74, platforms 64, and products 68 are identical to the interfaces specified in the create new catalog section. If the networks 74, platforms 64, and or products 68 are changed, the system traverses the current selected content 108 and unselects all content not currently supported by the new configuration. Once the system is updated, the PM is taken back to the manage catalogs interface.

Associate Client Logins with Catalogs:

The PM, having created extranet logins 98 for contacts 94 and one or more catalogs 86 for the clients 96, now needs to associate which contacts can edit the catalogs in question. The PM is presented with a grid with catalogs 86 listed across and contacts 94 with extranet logins 98 listed down. Each intersection of a contact 94 and catalog 86 is represented by a checkbox. The PM can check or uncheck each checkbox; upon this action, the system creates or removes the corresponding mapping from the extranet login 98 to the catalog 86.

With reference to FIG. 2, the media management aspect 24 of the system also includes a catalog designer 110 which provides an integrated interface between a client user and the available library through the C2DMA 22. The catalog designer 110 allows for the creation of catalogs using standard technologies including JSP and Struts. Various interfaces of the catalog designer 110 and the functions provided thereby are described below. As previously mentioned, data related to catalogs is stored in system processors (FIG. 1).

Client Login/Logout:

A contact 94 accesses the system home page, which has a hyperlink to the login page. The login page has text fields for username and password, and a login button. The contact 94 gives name/password which is checked against the system database. If correct, a session is created for that contact 94. The contact 94 is then able to create and modify catalogs 86. All pages have a logout button. Also, when the session times out, the contact 94 is automatically logged out of the system.

Catalog Manager/Category Manager:

After a contact 94 has successfully logged into the system, he is taken to the catalog manager (FIG. 9). The contact 94 is presented with a list of catalogs 86 that have been defined by the PM for the client 96. Each catalog 86 provides a link to a category manager interface, which displays the categories associated with the catalog. (FIG. 10). If the system determines the contact 94 has authorized access to only one catalog 86, the contact is immediately presented to the category manager for that catalog.

Create New Category:

From the category manager, the contact 94 can choose to add new categories 106 to an existing catalog 86. In response to a request to create a new category, the system presents an interface screen (FIG. 11), whereby attributes are assigned to the new category. Relevant data about the new category 86 includes:

Category name

Product types (choose from list of available product types for catalog)

Default price code (choose from list of available price codes)

Rating filter

Choose if the category is seasonal; if so, enter start and end dates.

Choose whether the auto-add feature is enabled and if so, what existing category should be used as a template.

Upon completion of this form, the system creates a new category 106 object with the appropriate relationships and presents an updated category manager screen with the newly created category (FIG. 12). If the auto-add feature is enabled, the category 106 is immediately populated with the titles 104 from the auto-add source category. The category 106 name does not have to be unique throughout a catalog 86. Default values for price code, rating filter and seasonal status are inherited from the parent category.

Manage Categories:

Once a contact 94 has chosen a catalog 86 to manage, he is taken to the category manager interface (FIG. 12). This interface presents a list of all the subcategories defined under the root category of the catalog. Each category has links next to it to edit, create subcategories, manage content, and delete.

If the contact chooses to edit a category 106, he is taken to the edit category interface (FIG. 13) and presented with all of the category attributes. The category name is displayed in an editable text box through which it can be changed. Under the category name, other category attributes are presented including: default price code, rating filter, start date and end date.

The contact 94 can save or cancel the changes. If he saves the changes, the system modifies the category 106 to reflect the new attribute values. If the rating filter has been lowered, the system removes all selected titles 104 from the category 106 that no longer meet the rating requirements. In one configuration of the system, the titles are left in place, thus allowing the client to see what titles have been removed. In either case (save or cancel) the contact is returned to the category manager interface (FIG. 12).

If the contact 94 chooses to manage category or subcategory content, the system presents a manage content interface, which is described below. If he chooses to delete the category 106, he is given a popup to confirm the action. If he confirms it, the system deletes the category and its dependent objects permanently.

Figure 15:
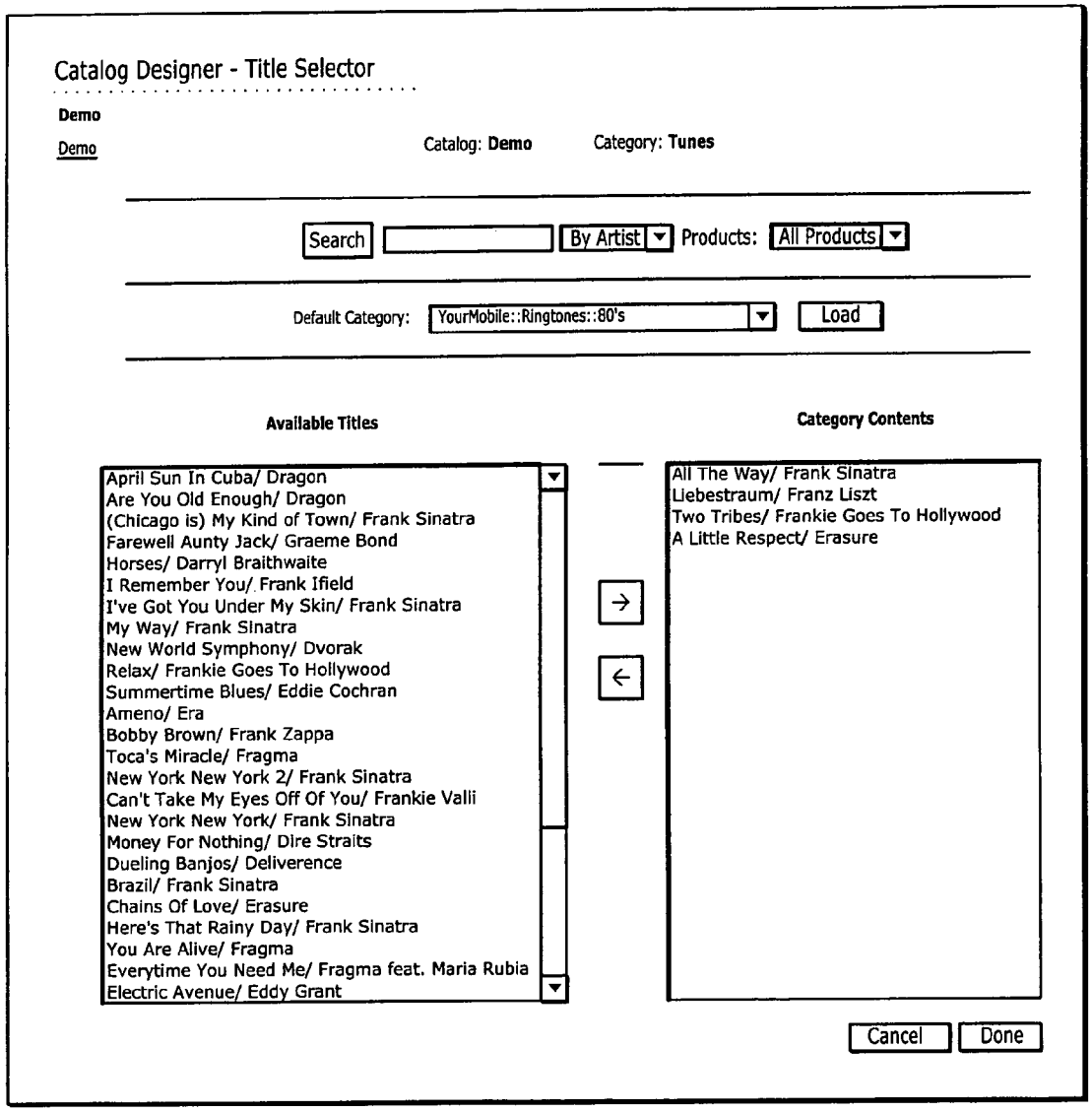

Add Content to Category:

The manage content interface (FIG. 14) provides a list of titles currently in the category, and allows for the addition of titles. Selecting the "add titles" option causes the system to present a title selector interface (FIG. 15). This interface allows the contact 94 to select a title from the list of available content for the platforms, products and networks associated with this category and catalog. The available list is further restricted based on the rating for the title. The contact can view this available list of titles in a number of ways:

Sorted alphabetically and paginated via a query containing one of the following:
        Artist name (substring match)
        Title (substring match)
        Exact rating (G, PG, PG-13, R, NC-17, X)
        Product type (choice of products configured for category)
        Platform type (choice of platforms configured for catalog)
        Template category—show content as grouped in an existing template category The contact 94 can select one or more titles 104 from this list to import into the category 106. The system creates a title 104 instance linked to each chosen title and assigns it the default price code 102. In addition, subject to catalog limit 100 constraints, selected content 108 entries are created for each platform product 66 (FIG. 7*a*) that matches the title with the category's configuration. The performances listed in a category 106 are unique, i.e., the same item cannot be added twice. As a default function, a single price applies to all selected versions of a title.

Add/Remove Selected Content by Platform:

A manage catalog interface allows a contact 94 to look at an existing catalog 86 and add or remove titles 104. The contact 94 goes to this page and sees a list of catalogs. A specific catalog can be selected and the "modify" button pressed. This brings up a page that displays the titles for that catalog. Specific titles can be selected and deleted.

There may also be titles in this "active catalog" that are shown, but not selected as active. The contact activates these by selecting the title line item (for a specific device). Also, the contact can go to a screen that shows the entire catalog of available items, select one or more items, and have them added to the active catalog.

Manage Price/Code Settings for Each Title:

Each title can be given a price code 102. Also, the price codes 102 can be modified globally, which automatically changes the price for all items using that code. The active catalog page contains a dropdown combo box for each line item title. The contact 94 can select from a list of price codes 102. The current price for that code is also displayed.

To change pricing, the contact 94 goes to a pricing page and sees a list of all price codes 102. An individual price code can be selected and modified. Also, existing price codes 102 can be deleted, and new ones created. If a price code 102 is deleted, all titles 104 that are set to that price code revert to the default price code. There is a default price code for the entire catalog 86. This is selected from a list of available price codes on a "pricing" page.

Manage Price Codes:

When a contact 94 chooses to manage price codes 102, he is taken to the manage price codes interface (not shown). The interface presents the contact with a list of all currently defined price codes, in an editable text box, with the set of prices (one price for each currency) to the right of the code in text boxes. The name of the price code can be changed, as can each of the prices.

Below the list of price codes the list continues with several lines of the same text boxes, all of which are blank. The contact can add new price codes by filling in the blank boxes. When the contact selects save, the system renames any price codes, resets any changed prices and adds any new price codes and prices.

Next to each price code in the list is a button to delete the price code. If the contact chooses to delete a price code, a pop-up confirmation is presented. If confirmed, the system checks if any titles are using the price code and returns an error page if the price code is currently in use. Otherwise, the price code and all associated prices are permanently deleted. If the price code being deleted was the default price code of any categories or subcategories, the category is modified to use the default "free" price code.

With continued reference to FIG. 2, the media management aspect 24 of the system also includes a Web services application tool 112 or content export tool which is part of the client-server interface 14 (FIG. 1) and provides an integrated interface between client servers 16 (FIG. 1) and a particular project catalog 86. The Web services application tool 112 is built utilizing XML and HTTP protocols and provides XML feeds of catalogs and the previews and content associated with a catalog in response to an HTTP request by a client server.

The following is generally needed to retrieve content information from the system servers: a client account in the system, one or more created catalogs within the system, and an Internet protocol (IP) address from which the client accesses the system. A client requests (via browser manually or server originated request), receives (via browser copy and paste or server catch), parses (to flat file or database importer), and stores (in flat file or database) catalog and content feeds. Using the catalog and content feeds, the client creates an HTML/Wireless Applications Protocol (WAP) display (flat file served to end-user interface or dynamically displayed from system database) interface (Storefront) for use by end-users.

A client accesses the content of a project catalog 86 with an XML request via HTTP. Once this is successfully passed into the system server, a response is generated and pushed to the client server 16 for display to the end user. In other embodiments, the responses may be provided to the client server by WAP pulling and other browser based delivery.

The process is as follows: The client sends a server 16 XML request via HTTP to the system server 10 to access its client-specific catalog 86. The code for an exemplary catalog request and its related schema is shown in FIG. 16. The following fields are in the request:

Catalog Request—the enclosing tag denoting that this is a catalog request
    Client Id—the assigned client ID for the partner
    Storefront Id—the storefront ID the partner requests
    Model Id—a device model ID, for which the partner is requesting content The Web services application tool 112 responds to HTTP POST requests and looks for a parameter with name XML to contain the actual request XML. The Web services application tool 112 uses a standard approach to error messaging.

Since it is built on the top of HTTP, it utilizes the robust and extensible platform of HTTP error messaging. All successful requests return HTTP status code 200. If an error occurs, the response will have error code 4xx.

If an XML request is detected by the Web services application tool 112, the catalog request is sent to the system server 10. The catalog request is handled via the system server 10 and a catalog response is generated as shown in FIGS. 17*a* and 17*b*. The code for an exemplary catalog response and its related schema is shown in FIGS. 17*a* through 17*d*.

- Catalog Response—the enclosing tag denoting that this is a catalog response
- Model—an end-user device, for which a client is requesting content
  - Id—a model Id as assigned by the system operator
  - Name—model's name
  - Make—model's manufacturer
- Product—describes the media types supported by the model
  - Id—a platform product Id as assigned by the system operator
  - Name—a formal definition of deliverable content that implies both media type and intended use
  - Platform—a media type supported by the model
- Category—a logical grouping of content within a catalog; category can contain other categories
  - Name—name of the category
  - Description—description of the category
- Title—a title of a given performance as stored in the catalog
  - Name—name of this performance
  - Type—performance type of the piece of content
  - Artist—artist or band
  - Price—price for all types of content with this title
- Title Attribute—additional attributes describing the above title
  - Type—attribute type
  - Value—attribute value
- Content Delivery Code—a unique Id for a piece of content that is derived via the storefront from which the content is being requested
  - Id—id of the content delivery code
- Product—product for which this title is available and supported by at least one of the requested models
  - Id—id for the product
- Preview—a URI pointing to a preview of the requested piece of content; one piece of content might have several previews with different media types
  - MediaType—media type of the preview
  - URI—URI of the selected piece of content Upon receipt of the catalog response, the client server 16 unwinds the XML within the response and builds an HTML or WAP storefront. The storefront may be a Web page displaying the content available within the requested catalog and end-user devices compatible with at least one of the displayed content types.

Figures 1, 18:
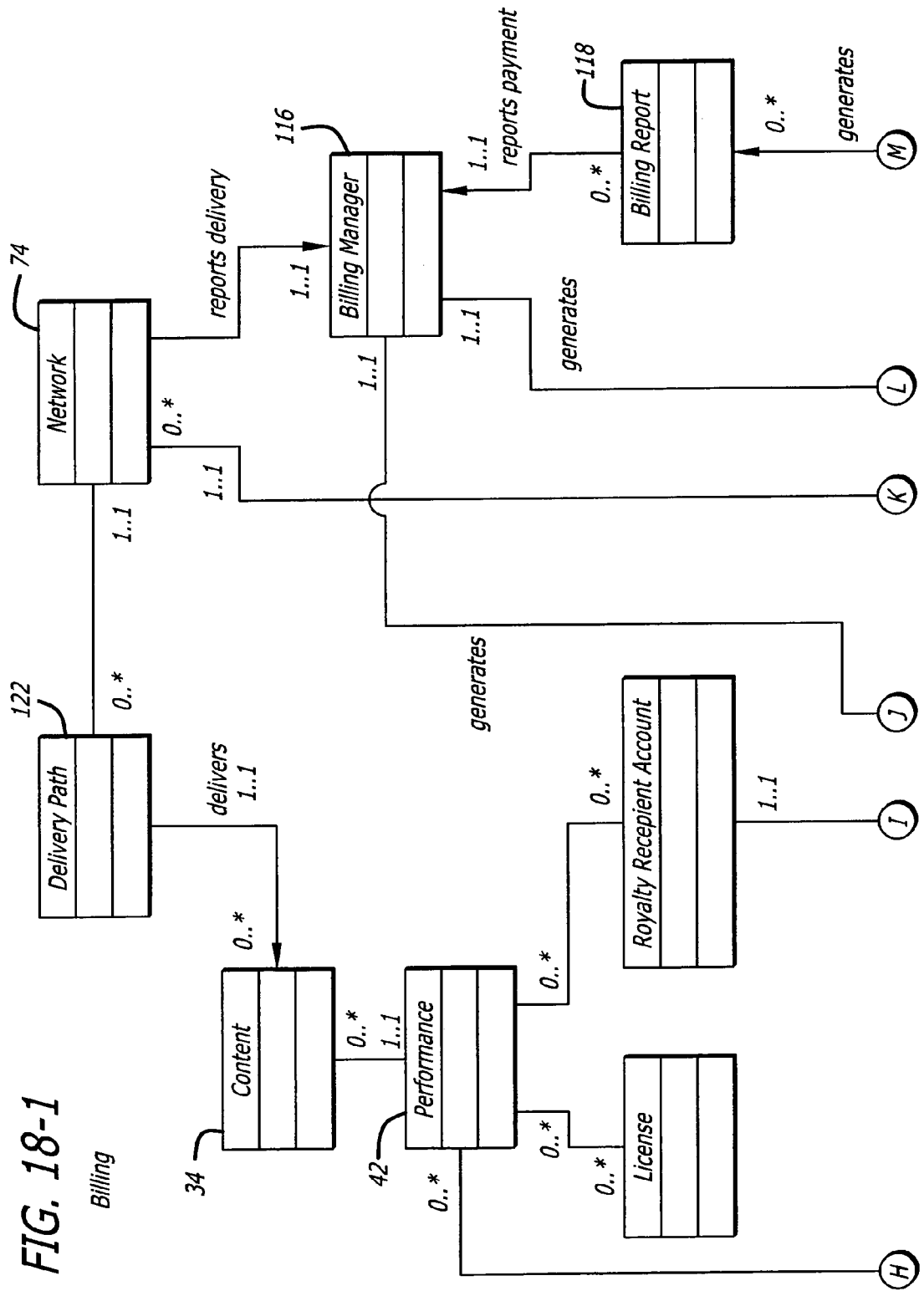
FIG. 18 is a conceptual model related to the billing interface aspect of the media delivery function of FIG. 2.
Figures 2, 18:
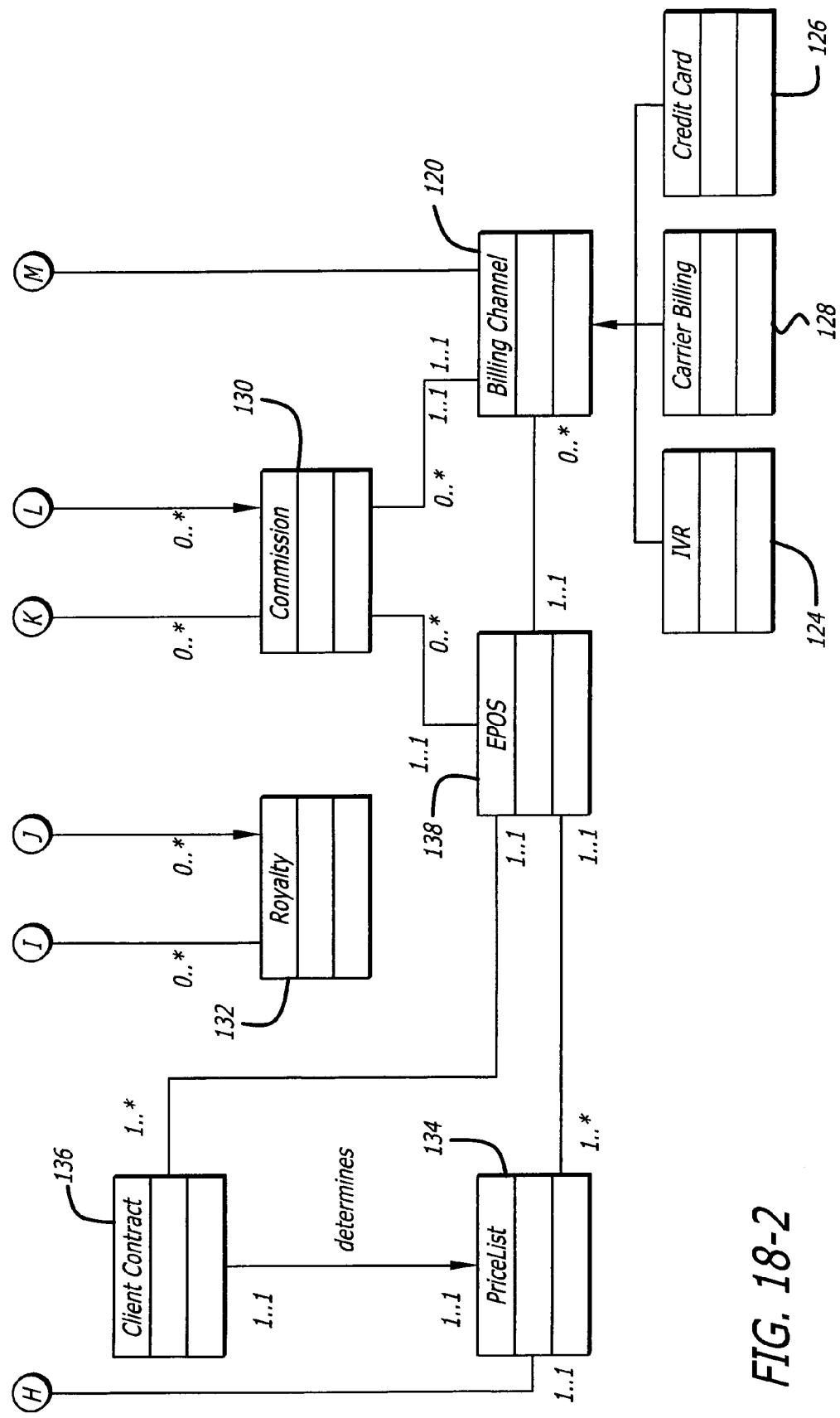

With reference to FIG. 2, the media management aspect 24 of the system also includes billing interfaces 114 which provide for the payment of content by the end user. A conceptual model of an exemplary billing interface is shown in FIG. 18. The billing manager 116 is the central object that reconciles billing reports 118 generated from a billing channel 120 with delivery reports generated by a network's 74 delivery of content 34 through a delivery path 122. The billing channel 120 may include any one of a 900 toll Interactive Voice Response (IVR) 124, 800 toll free IVR, credit card 126, carrier direct billing (CDB) 128 a prepaid card or other billing forms, such as Paypal.

From the billing report 118 and the network 74 delivery information, commissions 130 are calculated for the various entities in the sales pipeline. The sales pipeline is a conceptual model that includes all primary entities involved in the delivery of a particular piece of content 34, such as distributors, operators, billing partners, etc. The system calculates a commission share for each entity within the sales pipeline. In addition to commissions, royalties 132 are generated for use of the content 34 that was delivered. Of note is the price list 134, generated from a client contract 136 involving a point of sale (EPOS) 138 and the system operator. The contract drives which content 34 is available for sale at an EPOS, and the price that will be charged at the EPOS. Possible EPOSs include the Web, Wireless Applications Protocol (WAP), Mobile Originated Short Message Service (MOSMS), a prepaid card, print, advertising and IVR.

Media Delivery

With reference to FIG. 2, the media delivery aspect 26 of the system includes a request handler 140, a broker/converter 142, a distributor 144, monitoring tools 146 and customer service tools 148. The request handler 140 hosts the Web services application 14 (FIG. 1) and receives content requests from a client server.

In one embodiment, the content requests sent to the request handler 140 by the client server may contain the fields listed below. In other embodiments, less fields may be included. For example, the delivery address, content delivery code Id and operator Id are sufficient to deliver content. The code for an exemplary content request and its related schema is shown in FIGS. 19*a* and 19*b*.

- Content Delivery Request—the enclosing tag denoting that this is a content delivery request
- Delivery Address—destination phone number or e-mail address where content is to be sent
- Content Delivery Code Id—the requested content id; content Id uniquely identifies a piece of content as a part of a catalog; it doesn't represent the actual content; this is a unique id that is determined by matching the content with the storefront to which it will be delivered
- Picture Message Text—this is a special case of product—picture message, which along with a graphic can contain a text message
- Price—price of the requested piece of content; this is defined by combining the storefront and the billing method to calculate the cost to the end user
- Operator Id—the id assigned by the system operator that designates which mobile operator the piece of content will be sent through
- Storefront Id—The store front where the request is coming from
- Sales Channel Id—The sales channel used for this request; this helps determine how the client will pay for a piece of content; it identifies uniquely billing method which will be used, e.g., credit card, and point of sale, e.g., 800, Web site
- Client Transaction Id—the id tracked by the client for this content request
- Request Type—paid/free/resend, etc.
- Billing Address—in case when someone sends a content to a buddy, the billing address will be different from the delivery address Model Id—the model of a device that the piece of content will be sent to; the system operator provides the client with a separate document detailing the ids of the models it supports Upon receiving the request, the request handler 140 repackages the requests into a standard form and forwards it to the broker/converter 142. The request handler 140 also sends a content delivery response to the client-server, which contains the following fields. The code for an exemplary content response and its related schema is shown in FIG. 20.

Content Delivery Response—the enclosing tag denoting that this is a content delivery response Moviso Transaction—a transaction associated to this content delivery request
Id—the transaction id Client Transaction—a transaction Id used by the client for tracking this content delivery request
Id—the transaction id With reference to FIG. 7b, the broker/converter 142 translates the raw content 34 into a payload 160, i.e., a format specified by the encoding requirements/delivery format 162 used by the delivery channel 78 of the carrier network identified in the content request. The final payload 160 is placed in a que in the broker/converter 142 before being forwarded to the distributor 144 for transmission over the carrier's delivery network 74.

Figure 21:
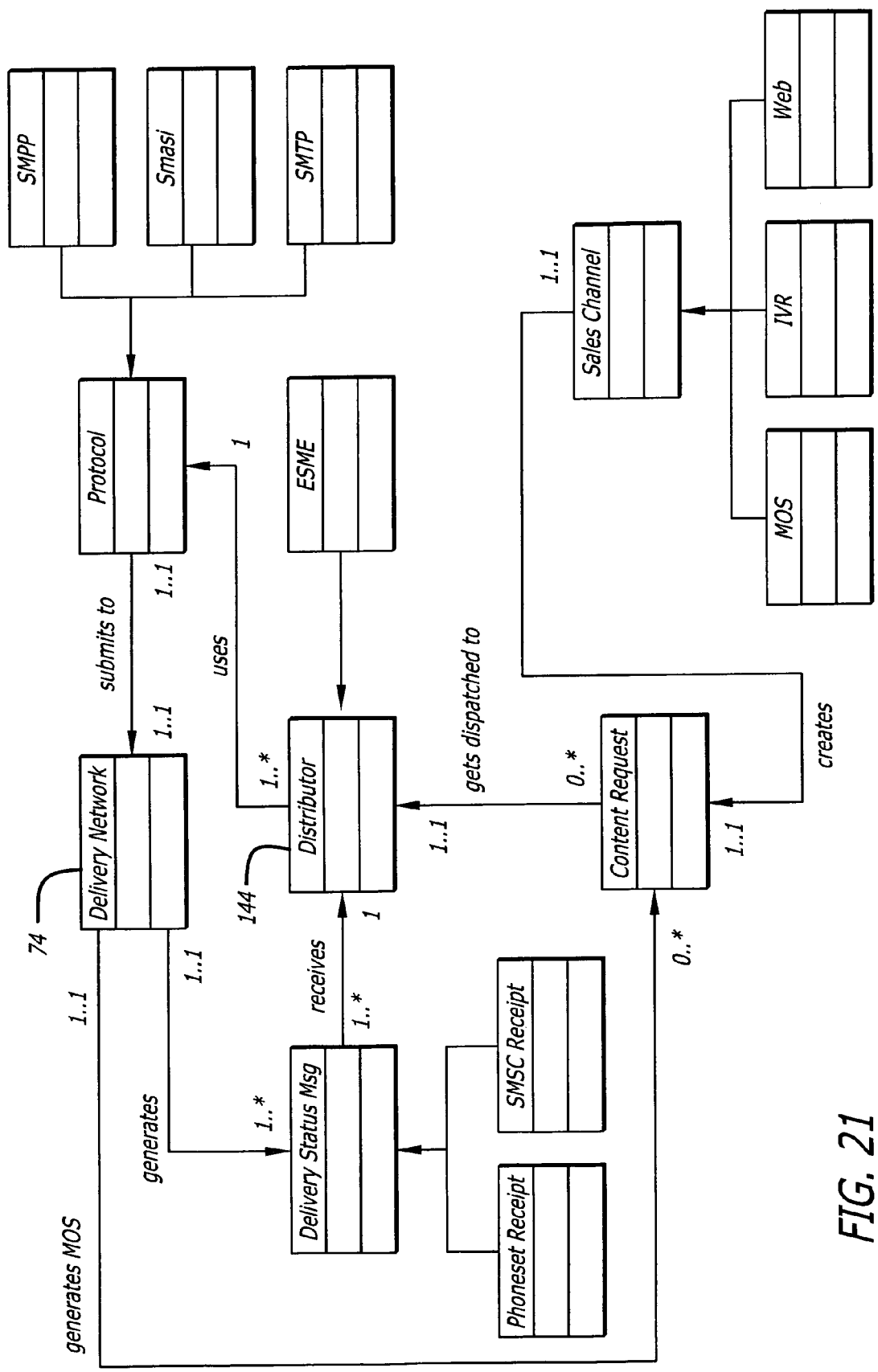
FIG. 21 is a conceptual model related to the distributor aspect of the media delivery function of FIG. 2.

A conceptual model of media distribution is shown in FIG. 21. The following abbreviations are used in the figure:
SMPP: Short Message Peer to Peer
SM/ASI: Short Message/Application Service Interface
SMTP: Simple Mail Transfer Protocol
ESME: External Short Message Entity
SMSC: Short Message Service Center
IVR: Interactive Voice Response
Delivery network: global system for mobile communication (GSM), time division multiple access (TDMA) or code division multiple access (CDMA) for second generation (2G) systems
MOSMS: Mobile Short Message Service Though not shown in the diagram, the system may be used with other delivery networks including the following third generation systems: third generation code division multiple access (3GCDMA), wideband code division multiple access (WCDMA), universal mobile telecommunication system (UMTS) and freedom of mobile multimedia access (FOMMA).

Figure 22:
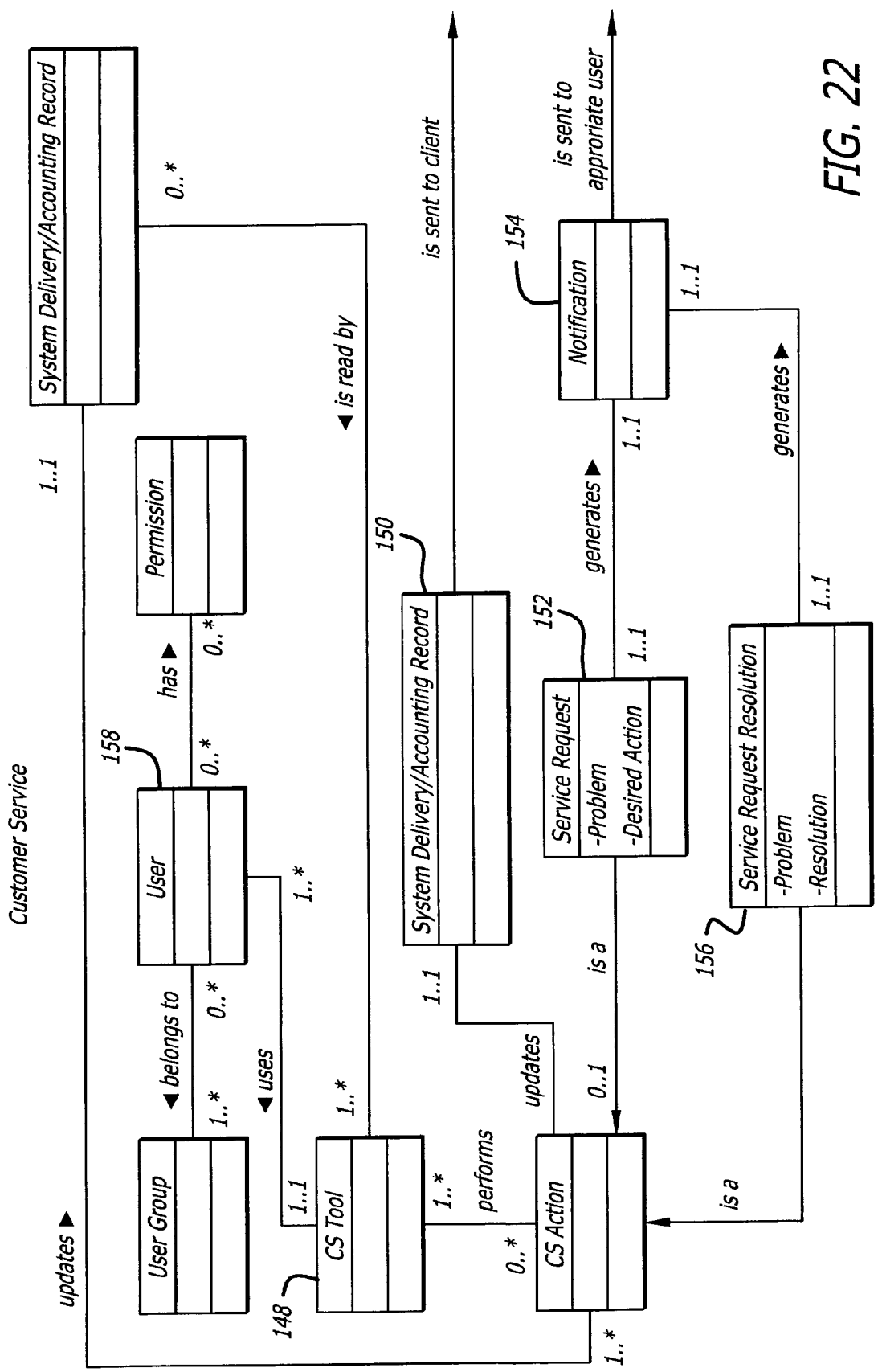
FIG. 22 is a conceptual model related to the customer service tools aspect of the media delivery function of FIG. 2.

With reference to FIG. 2, the system may also include a customer service (CS) tool 148 through which it provides various reports to the client and notifications to the end users. A conceptual model of the CS tool 148 is shown in FIG. 22. An exemplary content delivery/accounting report 150 contains the following information:
Content download transaction identifier
Content download date
Content type (ringtone,picture message,etc)
Content id
Content name
Accounting type (free,paid,credit,charge,etc)
Content download originator type (customer,cs rep,etc)
Delivery status (phoneset delivered,smsc delivered,buffered,rejected,etc)
Billing status (billed, not billed, refunded)

A service request 152 generates a notification 154, e.g. an email, which is sent to an appropriate notification receiver. The receiver searches for this service request in the CS tool 148 and resolves it, resulting in a service request resolution 156 and an associated notification delivery to an appropriate user 158.

As an additional feature, the request handler 140 provides an account status service to those clients using a pre-paid or MIN accounting system to bill the end user. To use this feature, the client sends an account status request which includes the following fields. The code for an account status request and its related schema is shown in FIG. 23.

Account Status Request—the enclosing tag denoting that this is an account status request Billing Address—this can be either an e-mail address, telephone number, home address, etc. that is being used to charge for delivery of the content; when someone sends a ringtone to a buddy, the billing address will be different from the delivery address Sales Channel Id—The sales channel used for this request. This is the means by which the user is charged, such as 800 IVR, 900 IVR, pre-paid, etc.

Store Front Id—The store front from which the request is coming

In response to the account status request, the request handler 140 generates an account status response which includes the following fields. The code for an account status request and its related schema is shown in FIG. 24.

Account Status Response—the enclosing tag denoting that this is an account status response Balance—the balance of the requested account While the foregoing description of the system has focused on the provision of audio-based media content, particularly ringtones, to cellular telephones, the system may be used to provide any type of media content including visual-based and audiovisual-based media content to any one of a variety of communication devices, such as those described earlier.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A system for making one or more pieces of media content available for delivery to an end-user device, said system comprising:
a file server having a plurality of media content files stored therein;
a database adapted to associate content type attributes with each of the media content files and attribute capability constraints with the end-user device, the attribute capability constraints prescribing a range of acceptable values for content type attributes;
a first rules engine adapted to create a relationship available library of media content excluding all media content that have content type attributes outside the range of acceptable values.

2. The system of claim 1 wherein the media content files comprise any one of audio-based data, visual-based data, audiovisual-based data and software application data.

3. The system of claim 2 wherein the audio-based data comprises any one of ringtones, monophonic ringtones, polyphonic ringtones, songtones, monophonic songtones, polyphonic songtones and voice greetings.

4. The system of claim 2 wherein the visual-based data comprises any one of screen savers, operator logos, picture messages, caller icons, animations, e-greetings, photographs, games and motion pictures.

5. The system of claim 2 wherein the software application data comprises any one of games, alert applications and media players.

6. The system of claim 2 wherein the audiovisual data comprises any one of audio-based data in combination with any one of visual-based data.

7. The system of claim 1 wherein the content type attributes have associated content attribute values and the first rules engine creates the relationship available library based on the content attribute values.

8. The system of claim 1 wherein the end-user device supports at least one platform capable of receiving at least one platform product, the platform product having associated media capabilities, the media capabilities associated with the attribute capability constraints.

9. The system of claim 8 wherein the platform includes data indicative of a delivery protocol associated with the end-user device.

10. The system of claim 9 wherein the protocol comprises one of hypertext transfer protocol (HTTP), short message peer-to-peer (SMPP), simple mail transfer protocol (SMTP), binary runtime environment for wireless (BREW), wireless applications protocol (WAP) push or pull, Download Fun, a carrier-proprietary protocol, e-mail and i-mode/packet switch network.

11. The system of claim 1 wherein the database is further adapted to associate a carrier network with the end-user device, the carrier network having an associated delivery channel capacity, the system further comprising a second rules engine adapted to create a capability available library based on the relationship available library, the capability available library excluding all media content not supported by the delivery channel of the end-user device.

12. A method for making one or more pieces of media content stored within a file server available for delivery to an end-user device, said method comprising:
associating content type attributes with each of the media content files;
associating attribute capability constraints with the end-user device, the attribute capability constraints prescribing a range of acceptable values for content type attributes;
creating a relationship available library of media content excluding all media content that have content type attributes outside the range of acceptable values.

13. The method of claim 12 wherein the media content files comprise any one of audio-based data, visual-based data, audiovisual-based data and software application data.

14. The method of claim 12 wherein the content type attributes have associated content attribute values and the relationship available library is created based on the content attribute values.

15. The method of claim 12 wherein the end-user device supports at least one platform capable of receiving at least one platform product, said method further comprising:
associating the platform product with media capabilities; and
associating the media capabilities with the attribute capability constraints.

16. The method of claim 12 further comprising:
associating a carrier network with the end-user device, the carrier network having an associated delivery channel capacity; and
creating a capability available library based on the relationship available library, the capability available library excluding all media content not supported by the delivery channel of the end-user device.

17. A system for forming a catalog of media content compatible with one or more end-user devices, said system comprising:
means for assigning at least one wireless network to the catalog, the wireless network having an associated delivery channel capacity;
means for assigning at least one platform supported by the assigned at least one network, the platform having at least one associated end-user device which in turn has associated attribute capability constraints, the attribute capability constraints prescribing a range of acceptable values for content type attributes;
a file server having a plurality of media content files stored therein;
a database adapted to associate content type attributes with each of the media content files and associate a carrier network with the end-user device;
a first rules engine adapted to create a relationship available library of media content excluding all media content that have content type attributes outside the range of acceptable values;
a second rules engine adapted to create a capability available library based on the relationship available library, the capability available library excluding all media content not supported by the delivery channel of the end-user device; and
means for selecting media content from the capability available library for importation into the catalog.

18. The system of claim 17 wherein the means for assigning at least one wireless network comprises:
means for providing a list of wireless networks for which media content is available; and
means for individually selecting wireless networks.

19. The system of claim 18 wherein at least one network is selected.

20. The system of claim 18 wherein a plurality of networks are selected.

21. The system of claim 17 wherein the at least one wireless network comprises one of a global system for mobile communication (GSM), time division multiple access (TDMA) and code division multiple access (CDMA) carrier network, third generation code division multiple access (3GCDMA), wideband code division multiple access (WCDMA), universal mobile telecommunication system (UMTS) and freedom of mobile multimedia access (FOMMA).

22. The system of claim 17 wherein the means for assigning at least one platform comprises:
means for providing a list of platforms supported by the assigned wireless network; and
means for individually selecting platforms.

23. The system of claim 22 wherein at least one platform is selected.

24. The system of claim 22 wherein a plurality of platforms are selected.

25. The system of claim 17 wherein the platforms are defined by the models of the end-user devices.

26. The system of claim 25 wherein the platforms are further defined by the makes of the end-user devices.

27. The system of claim 17 wherein the media content comprise any one of audio-based data, visual-based data, audiovisual-based data and software application data.

28. The system of claim 17 wherein each of the media content has an associated licensing-related parameter and the system further comprises:
means for assigning a licensing-related parameter to the catalog;

wherein the second rules engine is further adapted to create the capabilities available library to exclude all media content not satisfying the license-related parameter.

29. The system of claim 28 wherein the license-related parameter comprises any one of a geographical territory and approved clients.

30. The system of claim 17 wherein the means for selecting the media content comprises:
means for providing a list of the media content in the capabilities available library; and
means for tagging individual media content for importation.

31. The system of claim 17 wherein each of the media content has an associated content rating and the system further comprises:
means for assigning a content rating to the catalog;
wherein the first rules engine is further adapted to create the relationship available library to exclude all media content not satisfying the content rating.

32. A method of forming a catalog of media content compatible with one or more end-user devices, said method comprising:
assigning at least one wireless network to the catalog, the wireless network having an associated delivery channel capacity;
assigning at least one platform supported by the assigned at least one network, the platform having at least one associated end-user device which in turn has associated attribute capability constraints, the attribute capability constraints prescribing a range of acceptable values for content type attributes;
storing a plurality of media content files in a file server;
associating content type attributes with each of the media content files;
associating a carrier network with the end-user device;
creating a relationship available library of media content excluding all media content that have content type attributes outside the range of acceptable values;
creating a capability available library based on the relationship available library, the capability available library excluding all media content not supported by the delivery channel of the end-user device; and
selecting media content from the capability available library for importation into the catalog.

33. The method of claim 32 wherein assigning at least one wireless network comprises:
providing a list of wireless networks for which media content is available; and
individually selecting wireless networks.

34. The method of claim 32 wherein assigning at least one platform comprises:
providing a list of platforms supported by the assigned wireless network; and
individually selecting platforms.

35. The method of claim 32 wherein each of the media content has an associated licensing-related parameter and the method further comprises:
assigning a licensing-related parameter to the catalog;
creating the capabilities available library to exclude all media content not satisfying the license-related parameter.

36. The method of claim 32 wherein selecting the media content comprises:
providing a list of the media content in the capabilities available library; and
tagging individual media content for importation.

37. The method of claim 32 wherein each of the media content has an associated content rating and the method further comprises:
assigning a content rating to the catalog;
creating the relationship available library to exclude all media content not satisfying the content rating.

38. A system for delivering to a user interface via a client server, data indicative of a catalog of media content, said system comprising:
a database of a plurality of catalogs, each associated with a client, each catalog having at least one associated media content selected form a plurality of media content, each media content having associated content type attributes; and
a server adapted to:
receive a catalog request from the client server, the request including data indicative of the client, a client catalog and an end-user device,
assemble a response including data indicative of content associated with the client catalog, and
provide the response to the client server;
wherein the end-user device has associated attribute capability constraints prescribing a range of acceptable values for content type attributes and the media content associated with the catalog excludes all media content that have content type attributes outside the range of acceptable values.

39. The system of claim 38 wherein the end-user device has an associated carrier network having an associated delivery channel capacity, and the media content associated with the catalog further excludes all media content not supported by the delivery channel of the end-user device.

40. The system of claim 38 wherein the response is assembled into a graphical user interface at the client server for display to the end-user.

41. The system of claim 38 wherein the data indicative of the end-user device has an associated name and make and the response further includes data indicative of the name and make.

42. The system of claim 41 wherein the end-user device comprises any one of a cellular telephone, personal digital assistant (PDA), pagers, wireless e-mail devices, wireless calenders, GPS enabled devices and wireless game devices and the name and make of the end-user device comprises the model number and manufacturer of the end-user device respectively.

43. The system of claim 41 wherein the end-user device has at least one associated product having an associated name and platform and the response includes data indicative of the name and the platform of the product.

44. The system of claim 43 wherein the product comprises content types which the end-user device supports.

45. The system of claim 44 wherein the content types include one of audio-based content, visual-based content, audiovisual-based content and software applications.

46. The system of claim 43 wherein the platform includes data indicative of a delivery protocol associated with an end-user device.

47. The system of claim 46 wherein the protocol comprises one of hypertext transfer protocol (HTTP), short message peer-to-peer (SMPP), simple mail transfer protocol (SMTP), binary runtime environment for wireless (BREW), wireless applications protocol (WAP) push or pull, Download Fun, a carrier-proprietary protocol, e-mail and i-mode/packet switch network.

48. The system of claim 38 wherein the catalog comprises at least one category having a plurality of media content associated therewith and the response includes data indicative of the categories.

49. The system of claim 48 wherein each media content has an associated title and the category data includes data indicative of the title of the media content associated with the category.

50. The system of claim 49 wherein each media content has an associated name, type and price and the title data includes data indicative of the name of the title, the type of title and the price of the title.

51. The system of claim 49 wherein each media content has an associated content delivery code and the title data includes data indicative of the content delivery code.

52. The system of claim 49 wherein each media content has an associated product identification and the title data includes data indicative of the product identification.

53. The system of claim 49 wherein at least one of the media content has an associated preview with at least one associated media type and uniform resource identifier (URI) and the title data includes data indicative of the media type.

54. The system of claim 53 wherein the response includes the URI.

55. A method for delivering to a user interface via a client server, data indicative of a catalog of available media content, said method comprising:
  storing data defining a plurality of catalogs, each catalog associated with a client, and having at least one associated media content selected form a plurality of media content, each media content having associated content type attributes;
  receiving a catalog request from the client server, the request including data indicative of the client, a client catalog and an end-user device,
  assembling a response including data indicative of content associated with the client catalog, and
  providing the response to the client server;
  wherein the end-user device has associated attribute capability constraints prescribing a range of acceptable values for content type attributes and the media content associated with the catalog excludes all media content that have content type attributes outside the range of acceptable values.

56. The method of claim 55 wherein the end-user device has an associated carrier network having an associated delivery channel capacity, and the media content associated with the catalog further excludes all media content not supported by the delivery channel of the end-user device.

57. The method of claim 55 further comprising assembling the response into a graphical user interface at the client server for display to the end-user.

58. A system for delivering media content to an end-user device over an associated delivery channel, said system comprising:
  a file server having a plurality of media content files stored therein;
  means for providing to a user interface a catalog identifying a subset of the plurality of media content, the subset including only those media content supported by both the end-user device and the delivery channel;
  means for receiving a media content request from the user interface; and
  means for delivering the media content to the end-user device over the delivery channel.

59. The system of claim 58 wherein the means for providing a catalog comprises:
  a database adapted to associate content type attributes with each of the media content files and attribute capability constraints with the end-user device, the attribute capability constraints prescribing a range of acceptable values for content type attributes;
  a first rules engine adapted to create a relationship available library of media content excluding all media content that have content type attributes outside the range of acceptable values; and
  a second rules engine adapted to create a capability available library based on the relationship available library, the capability available library excluding all media content not supported by the delivery channel of the end-user device.

60. The system of claim 59 wherein the catalog is provided to the user interface through a client server and the means for providing a catalog further comprises a server adapted to:
  receive a catalog request from the client server, the request including data indicative of the client, a client catalog and the end-user device,
  assemble a response including data indicative of content associated with the client catalog, and
  provide the response to the client server.

61. The system of claim 58 wherein the means for receiving a media content request comprises a server adapted to receive data indicative of the delivery address of the end-user device, the network which supports the end-user device and the requested media content.

62. The system of claim 61 wherein the means for delivering the media content to the end-user device comprises a server adapted to:
  obtain the requested media content file from the file server;
  determine a delivery channel for the end-user device based on the delivery address and the network;
  convert the media content file to a protocol compatible with the delivery channel; and
  send the converted media content to the end-user device over the delivery channel.

63. A method of delivering media content to an end-user device over an associated delivery channel, said method comprising:
  storing a plurality of media content files in a file server;
  providing to a user interface a catalog identifying a subset of the plurality of media content, the subset including only those media content supported by both the end-user device and the delivery channel;
  receiving a media content request from the user interface; and
  delivering the media content to the end-user device over the delivery channel.

* * * * *